United States Patent
Venkataraman et al.

(10) Patent No.: US 8,705,361 B2
(45) Date of Patent: Apr. 22, 2014

(54) METHOD AND APPARATUS FOR TRAFFIC MANAGEMENT IN A WIRELESS NETWORK

(75) Inventors: Ramesh Venkataraman, Naperville, IL (US); Brian C. Nagle, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 774 days.

(21) Appl. No.: 12/816,333

(22) Filed: Jun. 15, 2010

(65) Prior Publication Data

US 2010/0315950 A1    Dec. 16, 2010

Related U.S. Application Data

(60) Provisional application No. 61/187,486, filed on Jun. 16, 2009.

(51) Int. Cl.
*H04L 12/26* (2006.01)
(52) U.S. Cl.
USPC ......... 370/235; 370/338; 370/401; 455/452.1
(58) Field of Classification Search
USPC ......... 370/230–236.1, 328–335, 395.21, 252; 455/7, 450–453
See application file for complete search history.

(56) References Cited

U.S. PATENT DOCUMENTS

| | | | |
|---|---|---|---|
| 4,720,850 A | 1/1988 | Oberlander et al. | |
| 4,893,302 A | 1/1990 | Hemmady et al. | |
| 5,280,475 A | 1/1994 | Yanagi et al. | |
| 6,262,974 B1 | 7/2001 | Chevalier et al. | |
| 6,320,863 B1 | 11/2001 | Ramfelt | |
| 6,374,112 B1 * | 4/2002 | Widegren et al. | 455/452.2 |
| 6,587,470 B1 | 7/2003 | Elliot et al. | |
| 6,608,832 B2 | 8/2003 | Forslow | |
| 6,678,281 B1 | 1/2004 | Chakrabarti et al. | |
| 6,741,595 B2 | 5/2004 | Mahar et al. | |
| 6,779,030 B1 | 8/2004 | Dugan et al. | |

(Continued)

FOREIGN PATENT DOCUMENTS

| | | |
|---|---|---|
| CA | 1295391 | 2/1992 |
| WO | WO 2005/017707 A2 | 2/2005 |

OTHER PUBLICATIONS

PCT/CA2006/001414, PCT Written Opinion of the International Searching Authority, Dec. 19, 2006.

(Continued)

*Primary Examiner* — Michael Thier
*Assistant Examiner* — Vincelas Louis
(74) *Attorney, Agent, or Firm* — Hamilton, Brook, Smith & Reynolds, P.C.

(57) ABSTRACT

Currently, network utilization and performance are diminished due to capacity issues, which may be resolved by adding hardware/software to spread traffic uniformly according to network element usage information. Disclosed is a method of and corresponding apparatus for resolving network element capacity issues in a wireless network by inspecting data traffic content for information about wireless network elements and data traffic content, collecting said information, and managing (e.g., shaping and steering) the incoming traffic based on the information. Examples of said information include radio bearer resource information for network elements and traffic associated with a wireless access portion of the wireless network and radio access bearer information for network elements and traffic associated with a backhaul portion of the wireless network. By employing embodiments of the invention, network utilization and performance may be increased using existing wireless network elements in a manner overlaid on existing network optimization techniques (e.g., load balancing).

33 Claims, 16 Drawing Sheets

(56) References Cited

U.S. PATENT DOCUMENTS

| | | | |
|---|---|---|---|
| 7,606,147 | B2 | 10/2009 | Luft et al. |
| 8,385,199 | B1 * | 2/2013 | Coward et al. ............. 370/230.1 |
| 2003/0203736 | A1 * | 10/2003 | Chi et al. ...................... 455/450 |
| 2005/0147061 | A1 * | 7/2005 | Francoeur et al. ............ 370/328 |
| 2007/0025301 | A1 * | 2/2007 | Petersson et al. ............. 370/338 |
| 2007/0259673 | A1 * | 11/2007 | Willars et al. ................. 455/453 |
| 2008/0192710 | A1 * | 8/2008 | Balachandran et al. ...... 370/338 |
| 2008/0240045 | A1 * | 10/2008 | Lekutai et al. ................ 370/335 |
| 2009/0029645 | A1 * | 1/2009 | Leroudier ......................... 455/7 |
| 2009/0232078 | A1 * | 9/2009 | Kekki et al. ................... 370/329 |

OTHER PUBLICATIONS

International Preliminary Report on Patentability and Written Opinion of the International Searching Authority, International Application No. PCT/CA2006/000555, Date of Issuance: Oct. 16, 2007.

Supplementary European Search Report, Application No. 06721804.0, Oct. 19, 2010.

Supplementary European Search Report, Application No. 06721804.0, Oct. 1, 2010.

* cited by examiner

METHOD AND APPARATUS FOR TRAFFIC MANAGEMENT IN A WIRELESS NETWORK

RELATED APPLICATION(S)

This application claims the benefit of U.S. Provisional Application No. 61/187,486 filed on Jun. 16, 2009. The entire teachings of the above application(s) are incorporated herein by reference.

BACKGROUND OF THE INVENTION

A wireless network may be described as a network that includes a wireless access portion between a base transceiver station and wireless devices. A wireless network may also include a backhaul network connected to the base transceiver station for transporting communication information, such as, for example, packets to other base transceiver stations or other nodes (e.g., servers) in the wireless network. Wireless networks may be used to support transmission of voice and data services between end user devices and service providers to connect end users to each other and/or to various service provider nodes. During periods of high use, such as lunch time during a work week, communications may be slowed or interrupted due to congestion. Currently, traffic management IS optimized for wired networks, where the number of end points is a constant.

SUMMARY OF THE INVENTION

An example embodiment of the present invention includes a method and corresponding apparatus of controlling data traffic flow in a wireless network. The method may include inspecting data traffic content at a node configured to determine radio bearer resource information associated with a wireless access portion of the wireless network. The data traffic content may also be inspected at a node configured to determine radio access bearer information associated with a backhaul portion of the wireless network. Data traffic flow may be controlled or otherwise managed as a function of the radio bearer resource information and the radio access bearer information.

Another example embodiment of the present invention includes a method and corresponding apparatus of managing data traffic flow in a wireless network. The method may include managing data traffic flow based on aggregated radio bearer resource information and radio access bearer information. The data traffic flow may be controlled based on the radio bearer resource information and radio access bearer information.

Another example embodiment of the present invention includes a method of and corresponding apparatus for controlling data traffic flow in a wireless network, such as to or from end user wireless devices. The method may include monitoring at least one logical link carrying data traffic flow or data traffic flow between non-wireless nodes of the wireless network. The method may also include causing a change of at least one parameter controlling data traffic flow as a function of the monitoring to support mobility of the end user devices relative to the non-wireless nodes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a network diagram that illustrates an example embodiment of the present invention which may be employed to control traffic in a wireless network to allow for the inclusion of additional devices to assist with traffic management;

DETAILED DESCRIPTION OF THE INVENTION

A description of example embodiments of the invention follows.

Wireless networks allow multiple end users in a variety of locations to receive data from and send data to the wireless network via a variety of end user devices. Presently, the quality of service/experience that an end user receives is directly proportional to the amount of usage transmitted and received via a particular channel used by the end user. In current practice, a content server or the like can be configured to perform load balancing to direct traffic through a network based on available links and the amount of traffic within the network. As the amount of traffic increases on a node in the network, an end user's quality of service/experience decreases. In such a case, end users may experience delays in receipt of traffic, which is particularly noticeable during Internet browsing or video conferencing, or the service/request may unexpectedly end. An example scenario is as follows: an end user begins using a mobile device (e.g., a smart phone) in an area of low usage, so (s)he is able to perform Internet browsing without issue. As (s)he travels, such as from a suburb to a city, the end user may notice that the quality of the requested service decreases as (s)he enters into an area having more users and/or an increased number of services requested via the same links. Current forms of traffic management include employing routers, application of priority schemes based on types of services requested by an end user, and/or allocating physical resources in the network to specific traffic flows. However, these forms of traffic management fail to take into account the mobility of end user devices or the hierarchical nature of a wireless network.

Example embodiments of the present invention allow for traffic management (e.g., shaping, steering, or controlling) that accounts for mobility of end user devices and/or hierarchical nature of a wireless network. The same or other embodiments of the present invention accomplish this by inspecting data traffic to determine radio bearer resource (RBR) information associated with a wireless access portion of the wireless network and radio access bearer (RAB) information associated with a backhaul portion of the wireless network. Then, the traffic in the wireless network may be controlled as a function of the RBR and RAB information.

Figures 1, 1A:
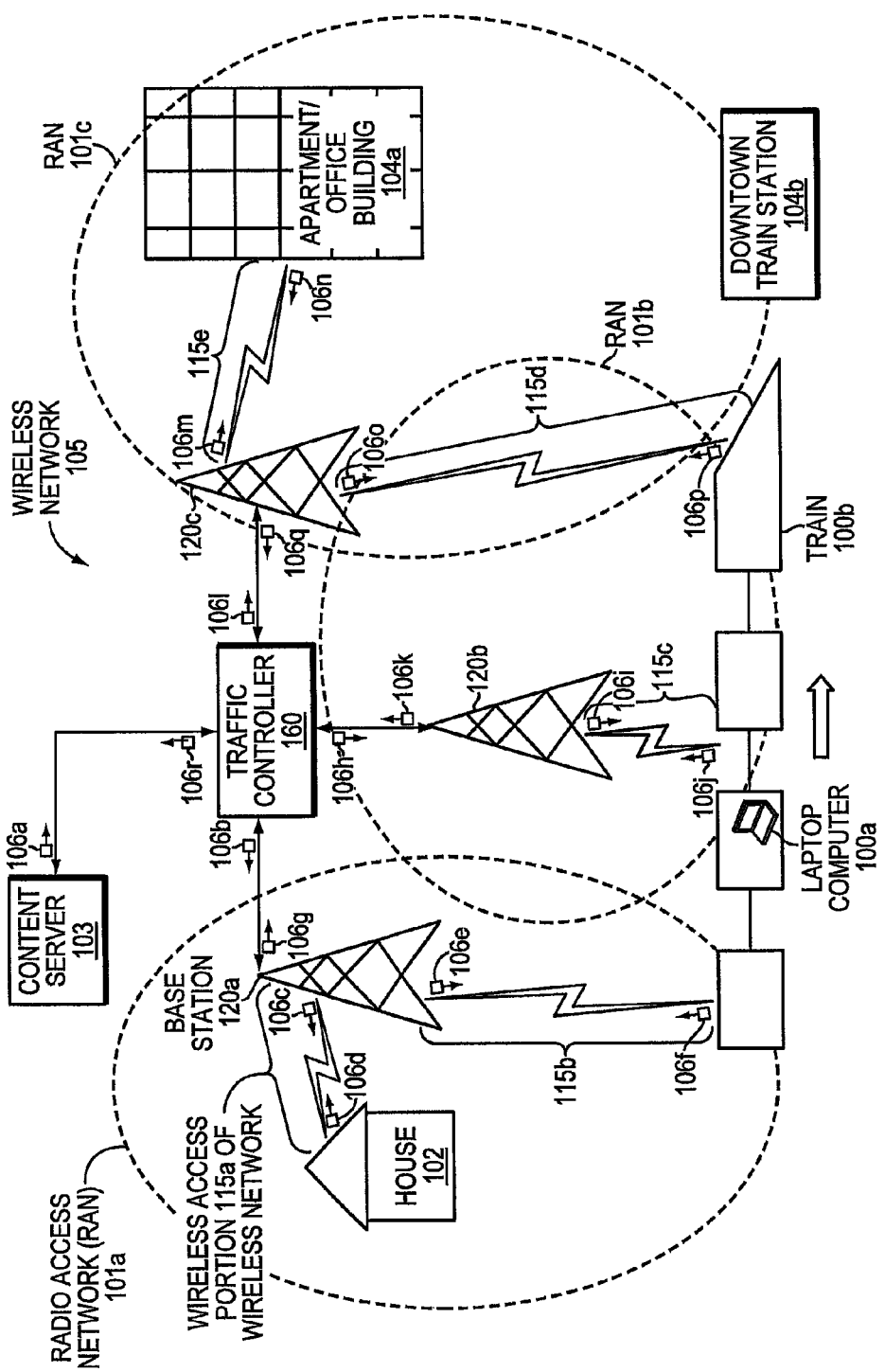
FIGS. 1A-1-1B-2 are network diagrams that illustrate example embodiments of the present invention which may be employed to control traffic in a wireless network.

FIG. 1A-1 illustrates an end user device 100a (such as, for example, a mobile device, cell/smart phone, computer (handheld or laptop), personal digital assistant (PDA), mobile navigation device, or the like) traveling through multiple radio access networks 101a-c within a wireless network 105. The wireless network 105 may include a content server 103, traffic controller 160, and multiple Radio Access Networks (RANs) 101a-c. The content server 103 may transmit traffic 106a to the traffic controller 160, which then transmits traffic 106b, 106h, 106l to each RAN 101a-c. Each RAN 101a-c may then transmit and receive traffic to/from the traffic controller 160 via corresponding wireless access portions 115a-c of the wireless network and base stations 120a-c.

In the example network of FIG. 1A-1, the traffic controller 160 transmits traffic 106b to a first RAN 101a via the base station 120a. The base station 120a then transmits traffic 106c to a residence, represented as a house 102, and traffic 106e to the end user device 100a via corresponding wireless access portions 115a, 115b and receives traffic 106d from the residential area 102 and traffic 106f from the end user device 100a. Then, base station 120a transmits traffic 106g to the traffic controller 160, which then transmits traffic 106r to the content server 103. As such, the RANs 101a-c may provide traffic (or mobile service) to the end user device, represented herein as a laptop computer 100a, that is being used by an end user (not shown), who may be traveling via train 100b from home in a suburban area (represented as the first RAN 101a) to work in an urban area (represented as a third RAN 101c) via a railway (e.g., subway or commuter rail) to the downtown train station 104c. The first RAN 101a may serve a residential area within an area having relatively few users or requested services, so the end user device 100a may be able to receive traffic 106e (such as, for example, Voice over Internet Protocol (VoIP) traffic, video conferencing traffic, Internet browsing traffic, etc.) without noticeable delays or issues caused by congestion. The end user device 100 may pass through a second RAN 101b and continue to receive uninterrupted traffic 106i from the traffic controller 160. However, as the end user device 100a reaches the urban area, shown as an apartment/office building 104a and downtown train station 104b, the traffic 106m, 106o may be slower, even if the network performs self-balancing. But, the addition of the traffic controller 160, in accordance with an example embodiment of the present invention, allows the traffic to be managed based on the radio bearer resource information and radio access bearer information, which provides additional optimization over typical load balancing. Additionally, the traffic controller 160 may employ the content server 103 to participate in the traffic management by causing the content server 103 to increase or decrease its rate of transmission or otherwise cause a change in its transmission of communications with end user device(s) 100a, such as through changing communications paths or transmitting communications using multicast techniques.

It should be understood that the content server 103 and end user device(s) 100a may be required to renegotiate communications parameters as a result of a change of a communications parameter in either the content server 103 or end user device(s) 100a. Further, the traffic controller 160 may serve as a termination point between communication end nodes and the content server 103 and may handle any renegotiations. As such, the end user device 100a should be able to enter the downtown train station 104b and still receive traffic 106o (e.g., video conferencing traffic) without noticing a decreased level of quality/experience, e.g., due to service interruption or increased buffering time. Accordingly, in at least one embodiment, the employment of a traffic controller 160 does not disrupt any service contracts for an end user device 100a because the traffic controller 160 can be configured to include service contracts for an end user device 100a as a communications parameter to be considered during traffic management. Further, the other network devices can perform their usual operations in the presence of the traffic controller 160 since the operations of the traffic controller 160, in effect, overlay on top of the operations of the other network devices. Moreover, obtaining the information used by the traffic controller 160 is seamless, and the information is already available in standard wireless network communications protocols.

An embodiment of the present invention includes a method of and corresponding apparatus for controlling data traffic flow in a wireless network. One embodiment includes inspecting data traffic content at a node configured to determine radio bearer resource (RBR) information associated with a wireless access portion of the wireless network and inspecting data traffic content at a node configured to determine radio access bearer (RAB) information associated with a backhaul portion of the wireless network. The data traffic flow may be controlled as a function of the RBR information and RAB information.

As used herein, the term "radio bearer resource information" includes information relating to the wireless transmissions used for communication within the wireless network, e.g., frequency, time, code, and other radio or related information. Radio bearer resource information is communicated from an air interface at the base station to a Radio Network Controller (RNC). In addition, the term "radio access bearer information" includes information about data flows transmitted to a RNC and Serving General Packet Radio Service (GPRS) Support Node (SGSN). Examples include source and destination addresses (e.g., Internet Protocol (IP) addresses or Media Access Control (MAC) addresses), transport protocol information, path information (e.g., physical or logical path information, including port number), Virtual Private Network (VPN) information, Label Switched Path (LSP) information, Multi-Protocol Label Switching (MPLS) information, or the like. The term "node" includes a device in a network that is capable of transmitting, receiving, or forwarding information over a channel within the network. The term "data" includes all services, except generally voice, that may be provided via a wireless network. However, at times, data may also be used to carry voice signals. This may occur, for example, when Voice over Internet Protocol (VoIP) is used for voice communications.

The apparatus for controlling data traffic flow in a wireless network may include a wireless access portion inspection unit, backhaul portion inspection unit, and control unit. The wireless access portion inspection unit may be configured to inspect data traffic content to determine RBR information associated with a wireless access portion of the wireless network. The backhaul portion inspection unit may be configured to inspect data traffic content at a node to determine RAB information associated with a backhaul portion of the wireless network. The control unit may be configured to control data traffic flow in the wireless network as a function of the RBR information and RAB information.

Another example embodiment of the present invention includes a method of and corresponding apparatus for managing data traffic flow in a wireless network. The method may include aggregating RBR information of the data traffic flow and RAB information, both of which may be used to control the data traffic flow in the wireless network.

The apparatus for managing data traffic flow in a wireless network may include a wireless access portion collection unit, backhaul portion collection unit, and a control unit. The wireless access portion collection unit may be configured to aggregate RBR information of the data traffic flow. The backhaul portion collection unit may be configured to aggregate RAB information of the data traffic flow. The control unit may be configured to control the data traffic flow based on the RBR information and RAB information.

Another example embodiment of the present disclosure includes a method of and corresponding apparatus for controlling data traffic flow in a wireless network. The method may include monitoring (i) at least one logical link carrying data traffic flow or (ii) data traffic flow between non-wireless nodes of the wireless network. Then, the method may include causing a change of at least one parameter controlling the data traffic flow as a function of the monitoring. The change may be done to support mobility of the end user device(s) relative to the non-wireless nodes (i.e., the network nodes in the backhaul portion of the wireless network). In addition, the data traffic flow may be to or from end user wireless device(s).

The apparatus for controlling data traffic flow in a wireless network may include a monitoring unit and control unit. The monitoring unit may be configured to monitor (i) at least one logical link carrying data traffic flow or (ii) data traffic flow between non-wireless nodes of the wireless network. The control unit may be configured to cause a change of at least one parameter controlling data traffic flow as a function of the monitoring.

Embodiments of the present invention provide for traffic management in a wireless network by gathering information from multiple nodes within the wireless network. Additional embodiments of the present invention may allow for traffic management to be performed along with policy controls, where various embodiments of the present invention may also be extended to a real-time based solution. As used herein, the term "policy control" may include, for example, service contract information in the form of Quality of Service (QoS) information on a per channel, customer, or traffic flow basis.

Further, an embodiment of the present invention may enable deep packet inspection (DPI) on radio bearer resource allocation information and radio access bearer allocation information. As used herein, the term "deep packet inspection" refers to observation of content of header or payload information, such as information about frequency(s), code(s), timeslot(s), or other information that allocates physical or logical resources to traffic flows. Additionally, as used herein, the term "allocation information" refers to the wired or wireless physical or logical resources that are allocated to end user device(s), communications paths or links, traffic, or traffic services between the end user device(s) and content servers or other nodes in the wireless network or a core network in communication therewith. DPI is a form of packet filtering that monitors header and payload of a packet as it passes through an inspection point. DPI may inspect Layers 2-7 of the Open Systems Interconnection (OSI) Reference Model. DPI may be used to determine source and/or destination of a data packet. As such, use of DPI may allow monitoring of resource usage and help to ensure that bandwidth is effectively and efficiently shared amongst end users (not shown). It should be understood that DPI is an example of a technique that may be used to obtain the relevant information. Examples of other techniques include inspecting routing or switching tables within nodes of the wireless network, Network Management System (NMS), or querying such nodes or end nodes.

In one embodiment, the DPI is performed in two steps. First, the DPI looks at radio resource control protocol for each packet and then determines a network wide flow rate. This flow rate is used by the traffic controller 160 to manage the traffic flow, e.g., to renegotiate communications parameters or transmit traffic at a changed communications state to accommodate the requested services for the end user device(s). While the present disclosure uses RBR and RAB information, other embodiments may use other information, such as parameters in traffic representing physical or logical information about an end user or end user device. Example embodiments of the present invention may also allow for traffic management in a wireless network as a function of inspecting (or reviewing) information included in a routing table, forwarding table, configuration table, or the like.

FIGS. 1A-2-1A-3 are network diagrams that illustrate an example embodiment of the present invention which may be employed to control traffic in a wireless network 105. The wireless network 105 may include base stations 120a-d, Radio Network Controllers (RNCs) 135a-b, Serving General packet radio Support Node (SGSN) 145, Gateway General packet radio Support Node (GGSN) 155, and traffic controller 160. The combination of the base stations 120a-d and RNCs 135a-b may be broadly referred to as a Radio Access Network (RAN); the combination of the SGSN 145, GGSN 155, and traffic controller 160 may be broadly referred to as a core network.

The wireless access portion 115a of the wireless network 105 may include base stations 120a-d that communicate via an air interface with an end user device 110 over a wireless medium, i.e., air. First base stations 120a-b may be controlled by a first RNC 135a, and second base stations 120c-d may be controlled by a second RNC 135b. As such, the RNCs 135a-b may be responsible for radio resource management (i.e., control signals used to manage physical or logical characteristics of nodes, devices, or communications traffic within the wireless network), mobility functions (i.e., functions that support an ability of wireless devices to move from wireless sub-network to wireless sub-network in a continuous or on-demand manner), and encryption of data being sent to and from the end user device 110. The RNCs 135a-b may also manage radio channels and terrestrial channels.

The RNCs 135a-b may communicate with the SGSN 145, which, in turn, communicates to the GGSN 155. The SGSN 145 may control the session and mobility aspects of traffic management (i.e., logical and mobile operations associated with an individual session, such as a call or interaction with another end user device or a content server). The GGSN 155 may perform subscriber control and services control (e.g., control of subscriber's access to services, data, or bandwidth). In this example embodiment, the wireless network 105 employs the GGSN 155 to allow traffic into and out of the wireless network 105 from an external network, for example, the Internet 165. The GGSN 155 may enable interworking, or translation of protocols, to allow communication of packets using, for example, a General Packet Radio Service (GPRS) protocol of the wireless network 105 and external networks, represented in this example embodiment as the Internet 165. Traffic management may be performed in the wireless network 105 by the traffic controller 160.

For ease of reference, the diagrams shown in this application use the term "traffic" to address data traffic flow throughout the wireless network 105. If the wireless network 105 is a third-generation partnership project (3GPP) network, the non-wireless devices (e.g., base station 120a-d, RNC 135a-b, SGSN 145, and GGSN 155) may each include interfaces, and, as each data traffic flow is transmitted across these interfaces, the data traffic flow is converted. For example, under 3GPP terminology, "Iub interface" is the interface between the base stations 120a-d and the RNCs 135a-b, and "IuPS interface" is the interface between the RNCs 135a-b and the SGSN 145. Similarly, the interface between the SGSN 145 and the GGSN 155 are referred to herein as the "Gn interface," and the interface between GGSN 155 and Internet 165 are referred to herein as the "Gi interface." The respective data traffic flows across these interfaces are referred to as Iub data flow 121*a*, IuPS data flow 136*a*, Gn data flow, and Gi data flow.

As illustrated in FIG. 1A-1, the data traffic flow (or traffic) 113 is transmitted to a base station 120*a-d* and converted into Iub data flow 121*a* that is received by the RNC 135*a*, 135*b* (which is explained below in reference to FIG. 3). The RNC 135*a*, 135*b* converts the Iub data flow 121*a* into IuPS data flow 136*a*. The IuPS data flow 136*a* is then transmitted to the SGSN 145 by the RNC 135*a*, 135*b* (which is explained below in reference to FIG. 4). The SGSN 145 converts the IuPS data flow 136 into the Gn data flow. The Gn data flow is then transmitted to the GGSN 155 by the SGSN 145. The GGSN 155 then converts the Gn data flow into the Gi data flow that is communicated to the traffic controller 160 (which is explained below in reference to FIGS. 5A and 5B).

Various nodes may process received data flow before transmitting it. For example, traffic 113 may be inspected (e.g., by DPI) at the base station 120*a-b* to determine the radio bearer resource (RBR) information 121*b* associated with a wireless access portion 115*a* of the wireless network 105. Then, the RNC 135*a-b* may inspect the Iub data flow 121*a* to determine the radio access bearer (RAB) information 136*b* associated with a backhaul portion 125*a-b* of the wireless network 105. The SGSN 145 transmits the Gn data flow, RBR information 121*b*, and RAB information 136*b* to the GGSN 155. Then, the GGSN 155 transmits the Gi data flow, RBR information 121*b*, and RAB information 136*b* to the traffic controller 160. Based on the radio access network topology information (e.g., RBR information 121*b* and RAB information 136*b*), the traffic controller 160 may control (e.g., shape and/or steer) data traffic flow in the wireless network 105 in accordance with an embodiment of the present invention. For example, after monitoring the RBR information 121*b* and the RAB information 136*b*, the traffic controller 160 may transmit traffic 180 in a changed communications state to the end user device 110 via the GGSN 155, SGSN 145, RNC 135*a*, and base station 120*a*. As used herein, the term "communications state" relates to the manner in which traffic is transmitted within the wireless network 105, for example, rate of traffic flow, bits per frame of traffic, communications paths, or the like.

In addition, the traffic controller 160 may receive Internet traffic 170 from the Internet 165, which may be included in the traffic 180 transmitted in a changed communications state, and transmit a rate control signal 183 to the Internet 165 to change a state of a communications parameter at the content server. An example of a changed communications state may be that the end user device 110 requests a service (e.g., Internet 165), which requires the end user device 110 to decrease the rate of receiving another service (e.g., voice) so that the end user device 110 receives the requested service.

Continuing to refer to FIG. 1A-1, the traffic controller 160 may receive requests for service from a network provider of the wireless network 105, the Internet 165, as well as other systems related to service requests from the service provider or network provider. Based upon the available radio resources and the service requested, the traffic controller 160 may shape the data traffic flow and transmit the traffic 180 in a changed communications state to an end user based upon the available radio resources. Accordingly, the traffic controller 160 may also steer the incoming traffic from another network, such as Internet traffic 170 from the Internet 165, by grouping the Internet traffic 170 based on a variety of considerations, such as the type of traffic being transmitted, building an adaptive shaping based on traffic management controls, or quasi-shaping/steering towards high usage base station traffic over low usage traffic. The traffic controller 160 may aggregate the various data flows and the Internet traffic 170, and transmit the traffic 180 at the changed communications state to the end user device 110, for example, via the GGSN 155, SGSN 145, RNC 135*a-b*, base station 120*a-d*, and wireless access portion 115*a* of the wireless network 105.

Figures 1, 1A, 2:
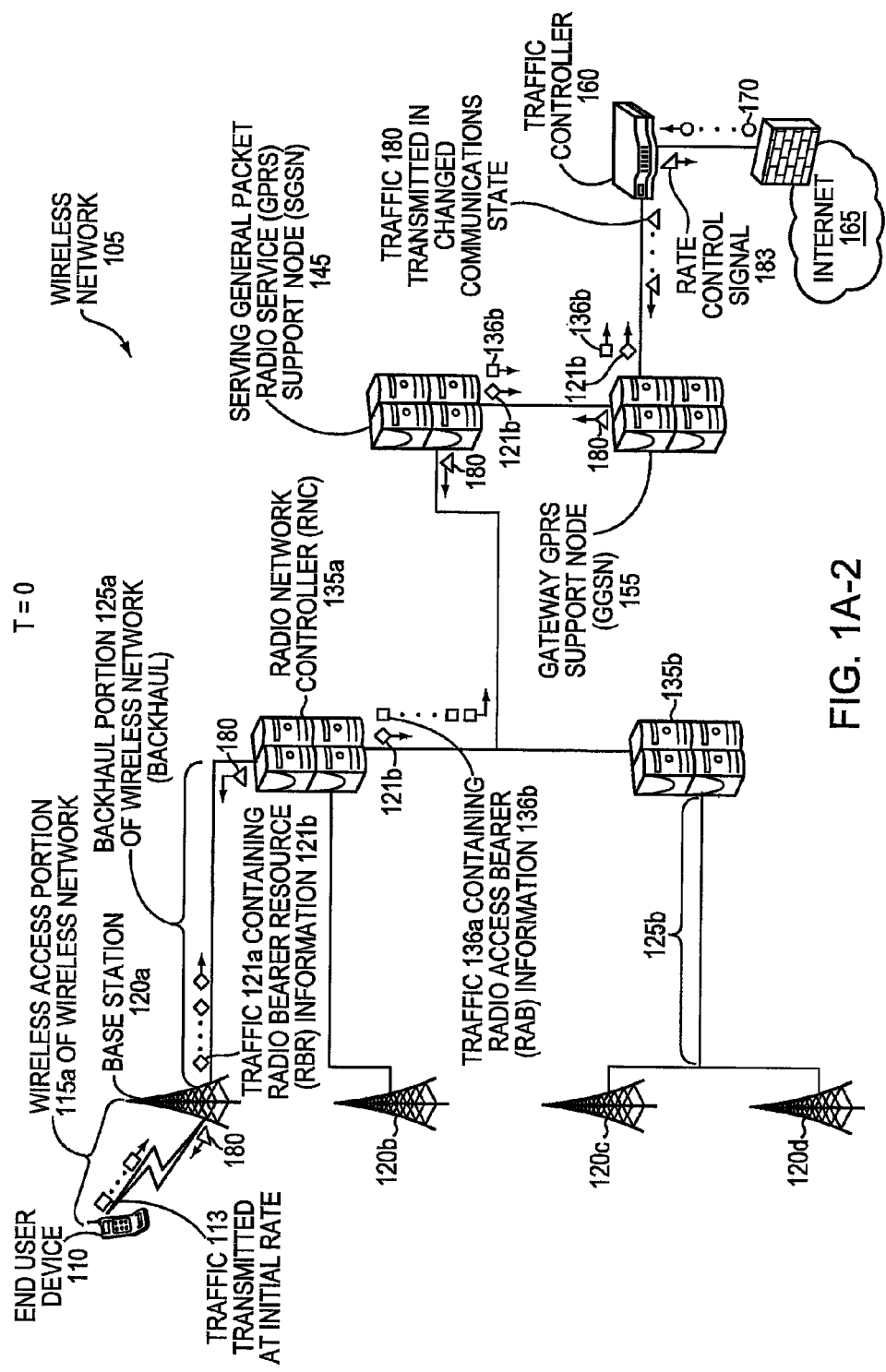

FIG. 1A-2 illustrates that, in response to the traffic 180 transmitted in a changed communications state, the end user device 110 may then transmit traffic 113' at a corresponding updated rate through the wireless network 105. Accordingly, each non-wireless node within the network will receive the updated traffic 113', inspect the traffic 113', and transmit the resulting traffic to the end user device in a similar manner as described above for FIG. 1A-1. For example, end user device 110 transmits traffic 113' to a base station 120*a-d*, which converts the traffic 113' into Iub data flow and inspects the traffic 113' to discover the updated RBR information 121*b*'. The base station 120*a-d* then transmits the Iub data flow and updated RBR information 121*b*' to the RNC 135*a-b*. The RNC 135*a-b* then inspects the Iub data flow to discover the updated RAB information 136*b*' and converts the Iub data flow into IuPS data flow. The RNC 135*a-b* then transmits the IuPS data flow, updated RBR information 121*b*', and updated RAB information 136*b*' to the SGSN 145. The SGSN 145 then converts the IuPS data flow into Gn data flow and transmits the Gn data flow, updated RBR information 121*b*', and updated RAB information 136*b*' to the GGSN 155. Then, the GGSN 155 converts the Gn data flow into Gi data flow and transmits the Gi data flow, updated RBR information 121*b*', and updated RAB information 136*b*' to the traffic controller 160. Based on the updated RBR information 121*b*' and updated RAB information 136*b*', the traffic controller 160 controls data traffic flow in the wireless network 105 by sending traffic 180' transmitted at the changed communications state (which may include updated Internet traffic 170') as well as an updated rate control signal 183' to the Internet 165.

Since end users in the wireless network 105 may be mobile, the number of end users associated with the base stations 120*a-d* may change over a period of time. FIGS. 1B-1 and 1B-2 are network diagrams that illustrate an example embodiment of the present invention which may be employed to control traffic for mobile end user devices in a wireless network 105. The wireless network 105 of FIGS. 1B-1 and 1B-2 may include base stations 120*a-d*, RNCs 135*a-b*, SGSN 145, GGSN 155, and traffic controller 160, which function in accordance with the description of FIGS. 1A-1 and 1A-2, respectively.

As illustrated by FIG. 1B-1, the end user device 110 may transmit traffic 113 at an initial rate to a base station 120*a* via a wireless access portion 115*a* of the wireless network. The base station 120*a* may then inspect the traffic 113 and transmit traffic 121*a* that contains RBR information 121*b* to the RNC 135*a*. The RNC 135*a* may then inspect the traffic 121*a* and discover the RAB information 136*b*, and then transmit the RBR information 121*b* and RAB information 136*b* to the traffic controller 160 via the SGSN 145 and GGSN 155. The traffic controller may also be configured to receive Internet traffic 170. The traffic controller 160 may then transmit traffic 180 at the changed communications state to the end user device 110 via the GGSN 155, SGSN 145, RNC 135*a*, first base station 120*a* and wireless access portion 115*a* of the wireless network 105. The changed communications state 180 may inform the RNC 135*a* that the end user device 110 is mobile and to direct traffic to the end user device 110 via a second base station 120*b*. The traffic controller 160 may also transmit a rate control signal 183 to the Internet 165.

As illustrated by FIG. 1B-2, the end user device 110 may transmit traffic 113' at an updated rate to a first base station 120a via a wireless access portion 115a of the wireless network 105. The base station 120a may then transmit traffic 121a' containing updated RBR information 121b' to the RNC 135a. In addition, the end user device 110 may transmit a hello message 190 via a wireless portion 115b of the wireless network 105 to a second base station 120b, which then transmits traffic 191a containing RBR information 191b to the RNC 135a. The RNC 135a may combine the RBR information 121b', 191b and transmit the combined RBR information 123b to the SGSN 145. The RNC 135a may also inspect the traffic 121a' from the first base station 120a and traffic 191a from the second base station 120b to discover the RAB information for each base station and then transmit the combined RAB information 137b to the SGSN 145. The SGSN 145 and GGSN 155 may then transmit the combined RBR information 123b and combined RAB information 137b to the traffic controller 160. The traffic controller 160 may also receive updated Internet traffic 170' and transmit an updated rate control signal 183' to the Internet 165. Based on the combined RBR information 123b, combined RAB information 137b, and updated Internet traffic 170', the traffic controller 160 may then transmit updated traffic 180' at the changed communications state to the end user device 110 via the GGSN 155, SGSN 145, RNC 135a, as well as base stations 120a, 120b and the corresponding wireless access portions 115a, 115b of the wireless network 105.

Continuing to refer to FIG. 1B-1, if a GGSN 155 treats the end users (or subscribers) the same in allocating resources, this may result in situations where the GGSN 155 is not effectively using the network 105 for data transfer purposes. For example, if the end user device 110 is receiving a great deal of data from the Internet 165, the traffic 180 at the changed communications state from the GGSN 155 to the RNCs 135a-b may be mostly dedicated to the end user device 110. However, as various other end users (not shown) enter the area of service of the base stations 120c-d, for example, they may not be able to receive adequate service. An embodiment of the present invention may allow for traffic shaping to, for example, reduce the amount of traffic to the RNC 135a to enable service to the other end users associated with the base stations 120c-d.

Additionally, controlling the data traffic flow may be done in upstream (from the end user device 110 to the traffic controller 160) and downstream (from the traffic controller 160 to the end user device 110) directions. The traffic 113 may be transmitted into the wireless network 105 via multiple logical links (not shown). Additionally, the RBR information 121b and RAB information 136b of FIG. 1B-1 may be gleaned periodically and the period may vary. A short period, such as, for example, 30 minutes, may be referred to as real time. The period for "real time" may vary for different embodiments of the present invention. For example, an embodiment of the present invention operating during peak rush hours may refer to real time as having a period of one or two minutes, while the same embodiment of the invention operating between, for example, midnight and 5 AM may refer to real time as having a period of 30 minutes.

An example embodiment of the present invention may further include controlling data traffic flow as a function of radio resource utilization and the backhaul resource utilization in, for example, the wireless network 105 of FIG. 1A-1, where utilization is calculated from the radio bearer resource information and the radio access bearer information. Additionally, the method may include controlling data traffic flow on a periodic basis, which is consistent with the mobility aspects of for example, the wireless network 105 of FIG. 1B-1. Doing so will allow the traffic controller 160 to control the data traffic flow across the entire network 105 based on information gleaned from the RBR information 121b and RAB information 136b. Also, the information gleaned from the RBR information 121b and RAB information 136b may be applied to traffic that enters the wireless network 105 by performing a deep packet inspection. Controlling data traffic flow may enable a wireless network provider to maintain a consistent quality of experience, such that data communications may be maintained at substantially constant rates with base stations 120a-d connected within the wireless network 105.

Figures 1, 1A, 2, 3:
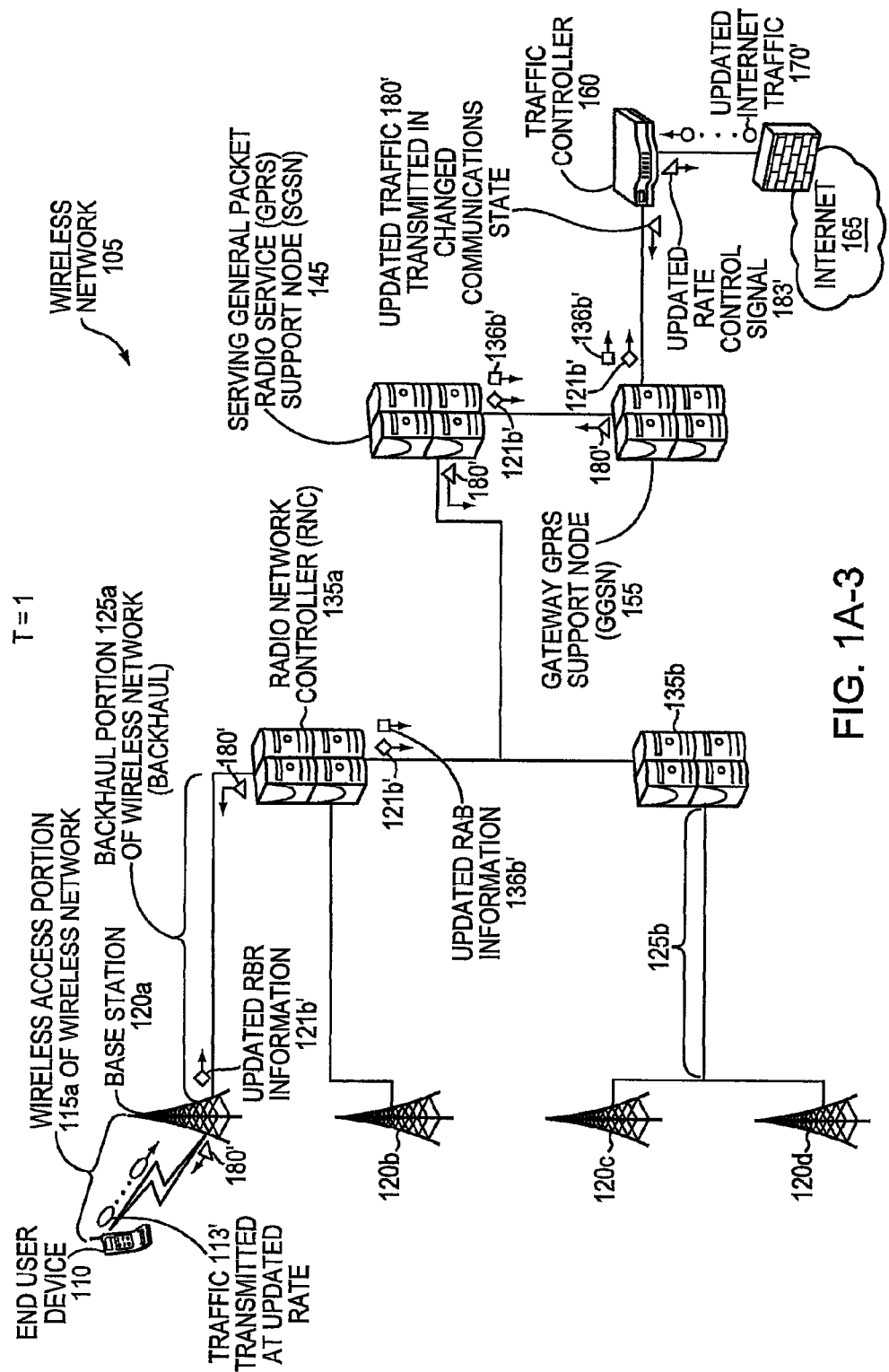
FIGS. 3-5B are flow diagrams depicting communication data flows that may occur within an example embodiment of the present invention.
Figures 1, 1B:
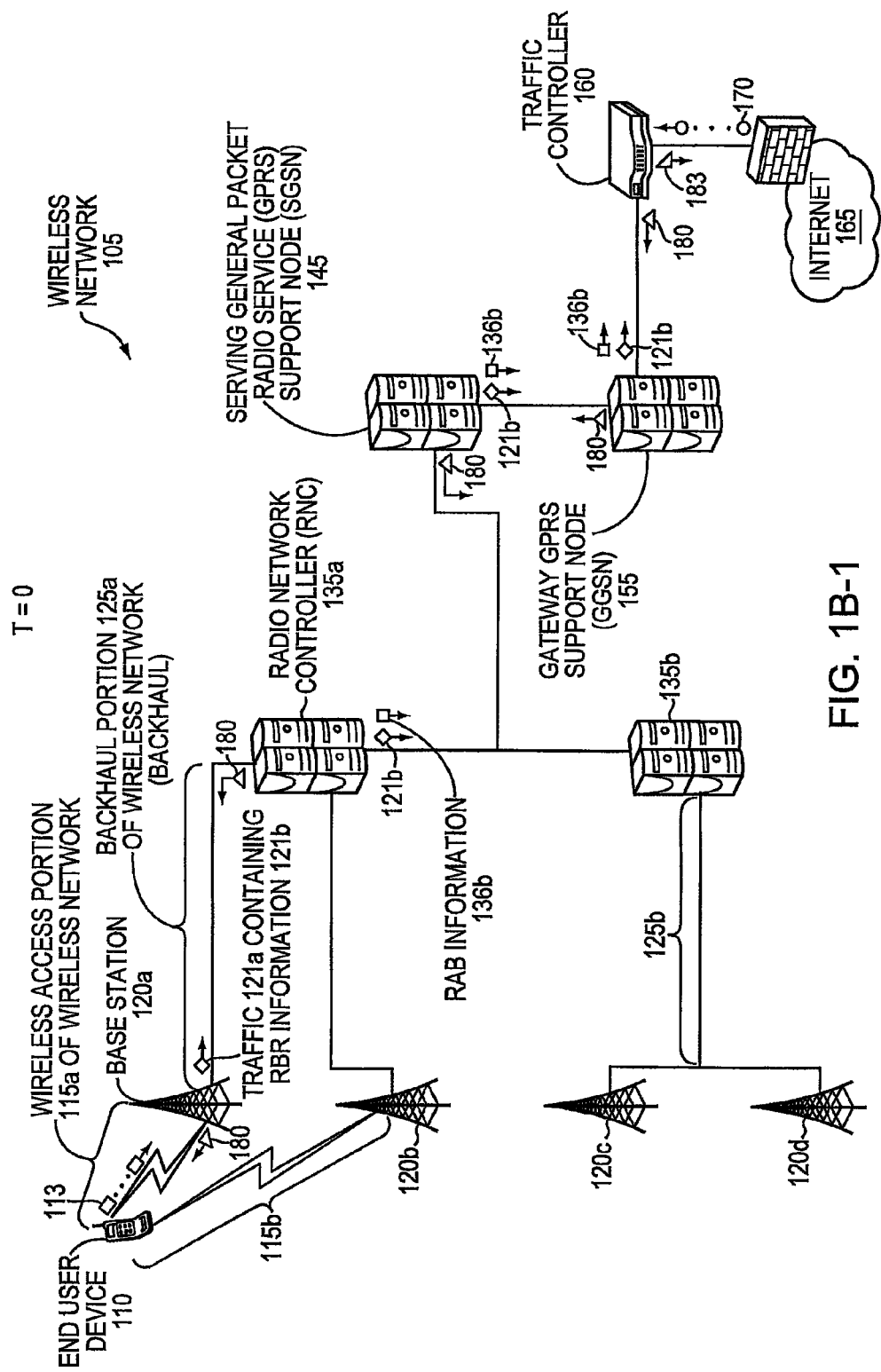
Figures 1, 1B, 2:
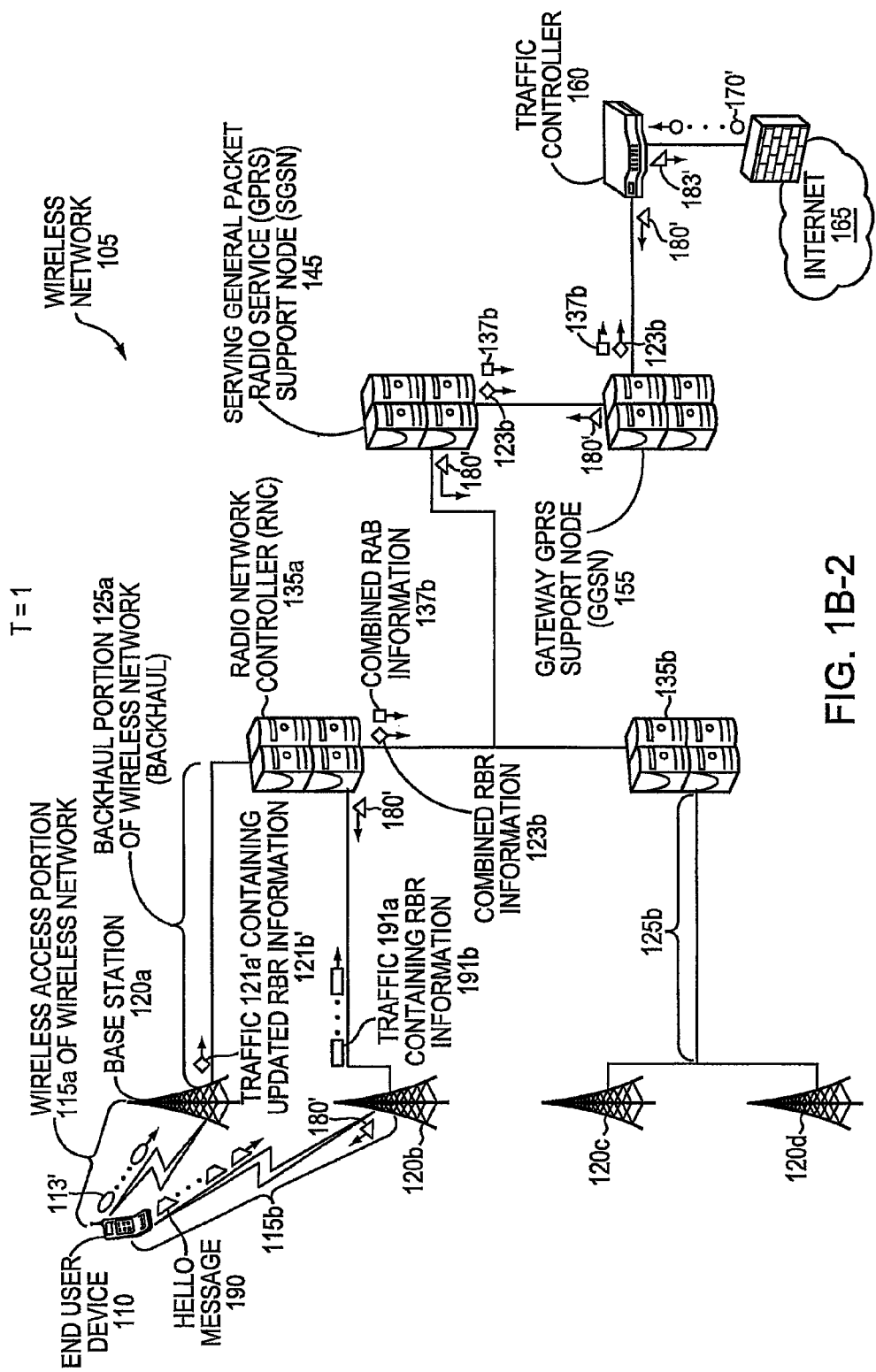
Figure 1C:
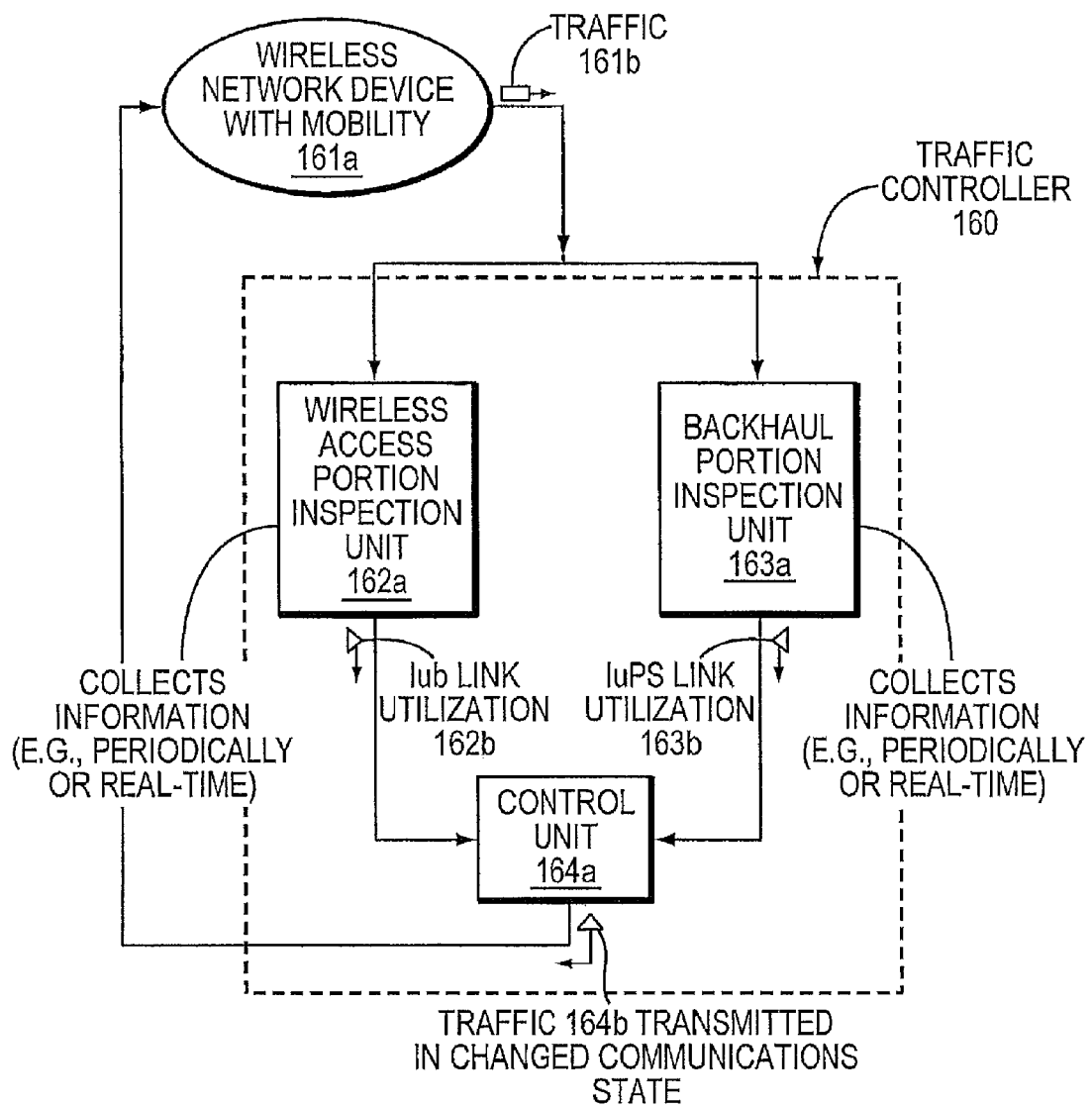
FIGS. 1C-1D are block diagrams illustrating an example embodiment of a traffic controller.

FIG. 1C is a block diagram illustrating an example embodiment of the traffic controller 160 (e.g., traffic controller 160 as illustrated and described in reference to FIG. 1B-1) that may be employed in accordance with an example embodiment of the present invention. The traffic controller 160 may be in communication with a wireless network device with mobility 161a, which may transmit traffic 161b to the traffic controller 160 (e.g., end user device 110 and traffic 113 of FIG. 1A-1). The traffic controller 160 may include a wireless access portion inspection unit 162a, which is configured to inspect the traffic 161b to determine radio bearer resource information and compute Iub link utilization information 162b. The traffic controller 160 may also include a backhaul portion inspection unit 163a, which is configured to inspect the traffic 161b to determine radio access bearer information and compute the IuPS link utilization information 163b. The wireless access portion inspection unit 162a and the backhaul portion inspection unit 163a may be configured to collect information periodically, or on an event-driven basis, for example.

Next, the wireless access portion unit 162a and the backhaul portion inspection unit 163a transmit the Iub link utilization information 162b and the IuPS link utilization information 163b, respectively, to the control unit 164a. The control unit 164a may then control the data traffic flow in the wireless network 105 based on the Iub link utilization information 162b and the IuPS link utilization information 163b. The control unit 164a may, for example, apply a shaper to the Iub link utilization information 162b and IuPS link utilization information 163b to generate a network wide flow rate factor. Then, based upon the network wide flow rate factor, the control unit 164a shapes and steers the data traffic flow into the traffic 164b that is transmitted in a changed communications state to the wireless network device with mobility 161a (see, e.g., end user device 110 of FIG. 1B-1). The control unit 164a may also modify the data traffic flow based on user-based parameters, e.g., type of data service request, location of user, utilization statistics for radio access bearer and radio bearer access, and requested quality of experience.

Figure 1D:
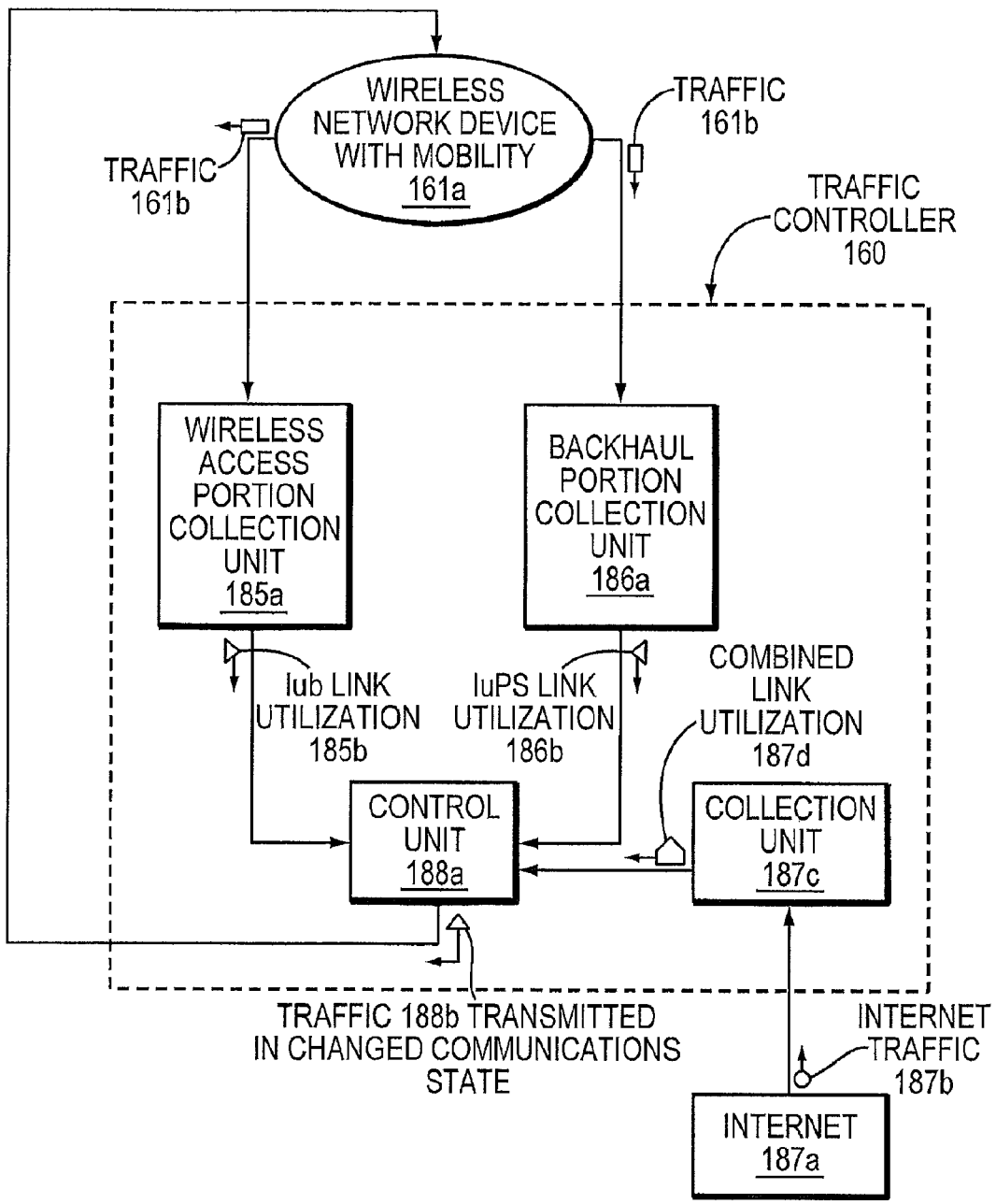
Figure 2:
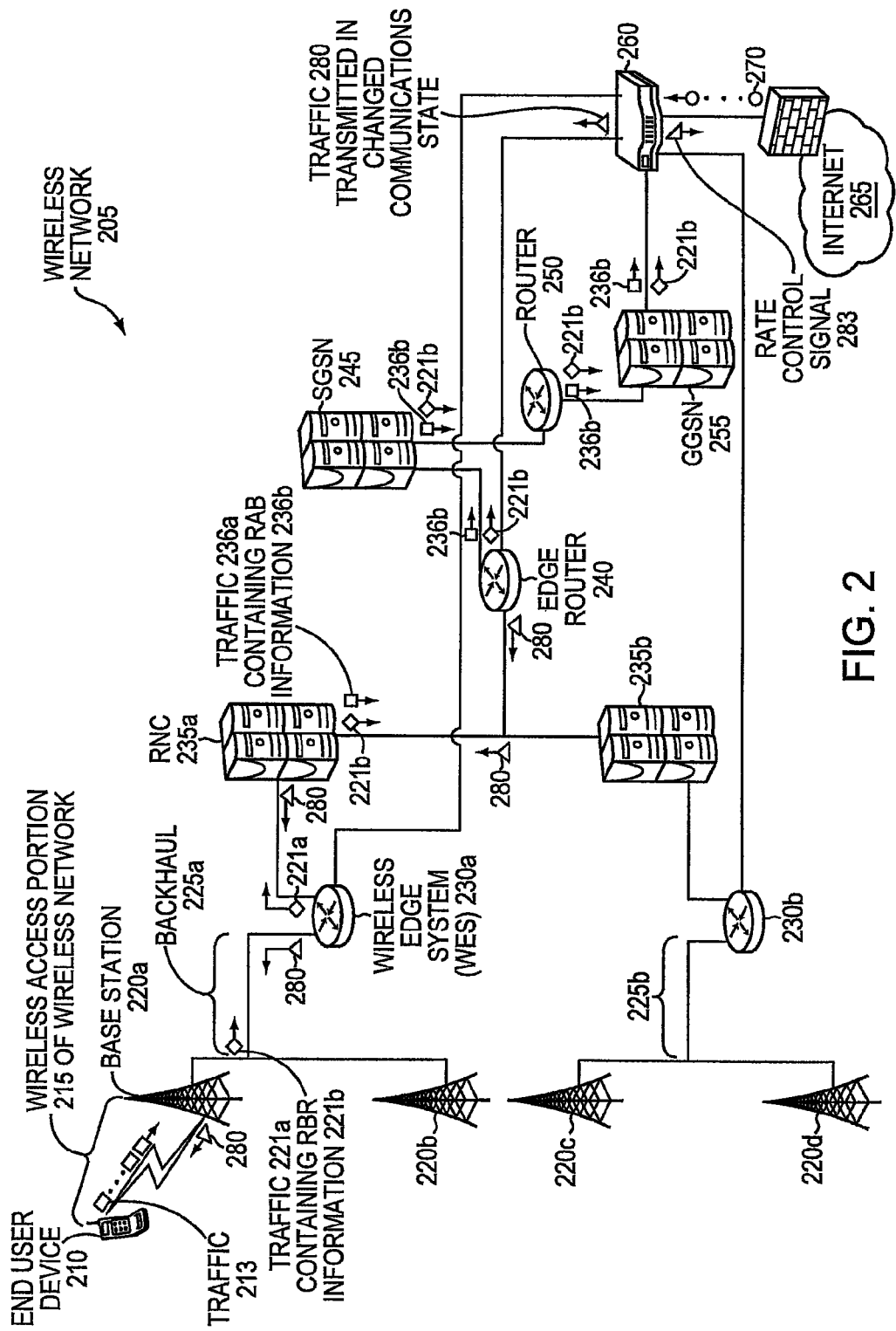
Figure 3:
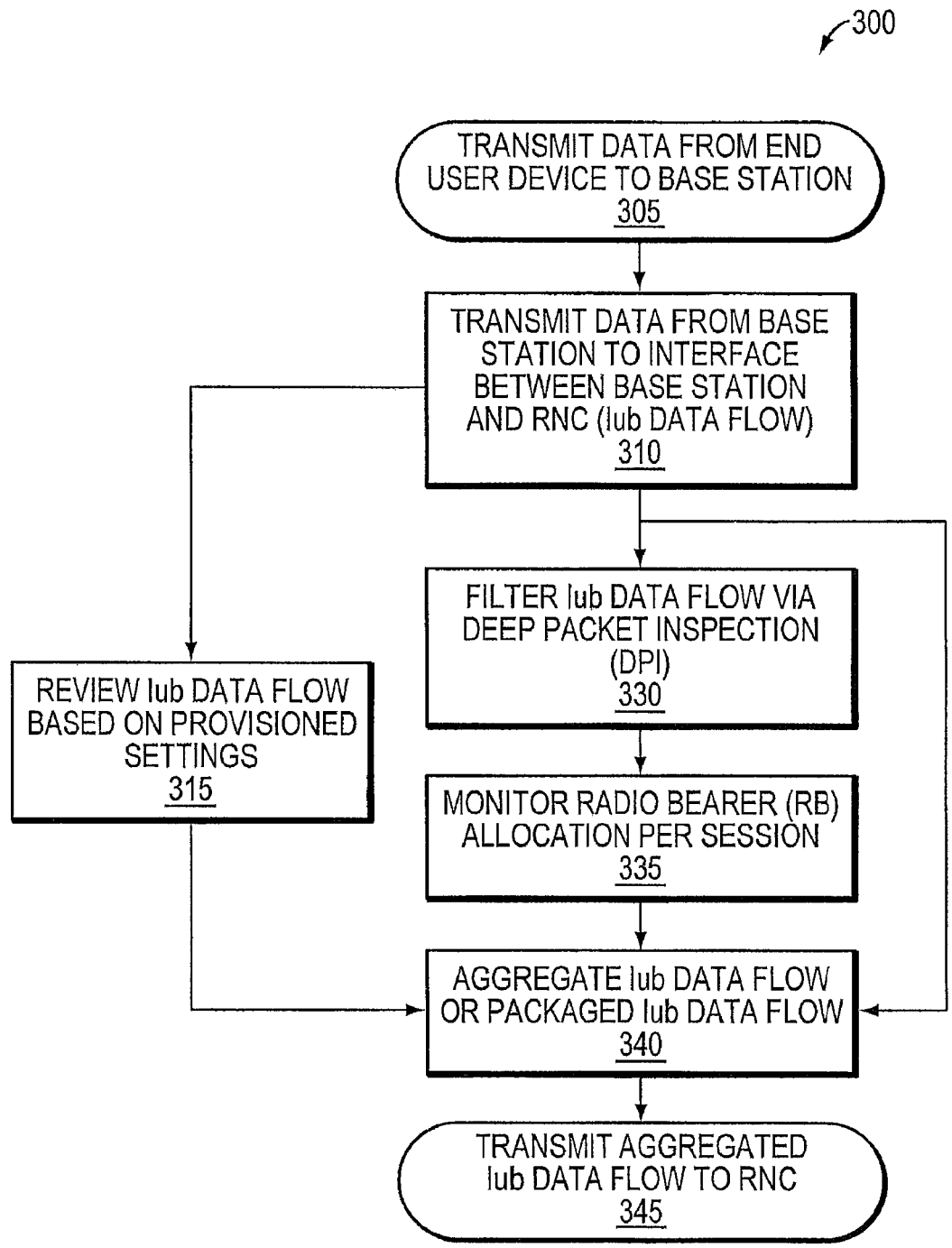

FIG. 1D is a block diagram illustrating another example embodiment of the traffic controller 160 (e.g., traffic controller 160 of FIG. 1B-1) that may be employed. The traffic controller 160 may be in communication with a wireless network device with mobility 161a, which transmits traffic 161b. The traffic controller 160 may include a wireless access portion collection unit 185a configured to collect (or aggregate) radio bearer resource information of the traffic 161b and compute Iub link utilization information 185b. The traffic controller 160 may also include a backhaul portion collection unit 186a configured to collect (or aggregate) radio access bearer information of the traffic 161b compute IuPS link utilization information 186b. The wireless access portion collection unit 185a and backhaul portion collection unit 186a may then transmit the Iub link utilization information 185b and IuPS link utilization information 186b, respectively, to the control unit 188a. The control unit 188a may then shape and steer the data flow based on the Iub link utilization information 185b and the IuPS link utilization information 186b.

Continuing to refer to FIG. 1D, the traffic controller 160 may also include a collection unit 187c. The collection unit 187c may be configured to collect (or aggregate) traffic flow from another network in communication with the wireless network, represented herein as Internet traffic 187b from the Internet 187a. As such, the collection unit 187c may be configured to inspect the Internet traffic 187b and detect the corresponding radio bearer resource information and the radio access bearer information. The collection unit 187c may then compute the Iub link utilization information and IuPS link utilization information for the Internet traffic 187b and transmit the combined link utilization information 187d to the control unit 188a. The control unit 168 may then control the data traffic flow in the wireless network based on the Iub link utilization information 185b, IuPS link utilization information 186b, and combined link utilization information 187d. For example, the control unit 188a may apply a shaper to the Iub link utilization information 185b, IuPS link utilization information 186b, and combined link utilization information 187d to generate a network wide flow rate factor. Then, based upon the network wide flow rate factor, the control unit 188a may shape and steer the data traffic flow by transmitting traffic 188b in a changed communications state to the wireless network device with mobility 161a.

FIG. 2 is a network diagram that illustrates an example embodiment of the present invention which may be employed to manage traffic in a wireless network 205. The wireless network 205 may be similar to the wireless network 105 of FIG. 1A; however, the wireless network 205 may include a Wireless Edge Systems (WESs) 230a-b and edge router 240. The wireless network 205 may include base stations 220a-d, WESs 230a-b, RNCs 235a-b, edge router 240, SGSN 245, router 250, GGSN 255, and traffic controller 260, or a subset thereof. Accordingly, the Radio Access Network (RAN) of the wireless network 205 may include the base stations 220a-d, WESs 230a-b, RNCs 235a-b, and edge router 240, and the core network may include the SGSN 245, router 250, GGSN 255, and traffic controller 260. Alternatively, the edge router 240 may be considered to be a part of the core network of the wireless network 205. Similarly to the wireless network 105 of FIG. 1A, the interfaces in the wireless network 205 may be employed as a 3GPP network.

In the wireless network 205, an end-user device 210 may be in wireless communication via a wireless access portion 215 of the wireless network 205 to several base stations 220a-d. Each base station may be in communication via a backhaul portion of the wireless network with a wireless edge system (WES), e.g., base stations 220a-b are in communication via backhaul portion 225a with WES 230a, and base stations 220c-d are in communication via backhaul portion 225b with WES 230b.

In addition, the WESs 230a-b may allow for packet switching technology because each has multiservice capabilities in a single network. Examples of multiservice capabilities include: Internet Protocol (IP), Multiprotocol Label Switching (MPLS), Ethernet, Asynchronous Transfer Mode (ATM), frame relay, Point-to-Point Protocol (PPP), High-Level Data Link Control (HDLC), and Time-Division Multiplexing (TDM). Each WES 230a-b may be connected to a respective radio network controller (RNC) 235a-b. The RNCs 235a-b control the base stations 220a-d of the wireless network 205. As such, the RNC 235a-b is responsible for radio resource management, mobility functions, and encryption of data being sent to and from the end user device 210. The RNC 235a-b also manages the radio channels and the terrestrial channels.

The RNCs 235a-b are also in communication with the edge router (or switch) 240 which maps paths and channels according to end user (not shown) and/or network operator (not shown) information. The edge router 240 is also in communication with a SGSN 245, which controls delivery of data packets to and from end user devices, such as the end user device 210, in a geographic area. The SGSN 245 is in communication with the GGSN 255 via the router 250. The GGSN 255 controls interworking, or translation of protocols to allow communication of packets using, for example, General Packet Radio Service (GPRS) protocol of the wireless network 205 and external networks, such as the Internet 265. The GGSN 255 is in communication with a traffic controller 260. The traffic controller 260 may be responsible for controlling data traffic flow in the wireless network 205 as a function of the radio bearer resource (RBR) information 221b and the radio access bearer (RAB) information 236b and made available by the WES devices 230a-b and edge routers 240. Then, the traffic controller 260 manages (e.g., shapes and steers) the data traffic flow through the wireless network 205 to the end user device 210, which may include Internet traffic 270 from the Internet 265.

For example, traffic 213 may be sent from the end user device 210 to a base station 220a via the wireless access portion 215 of the wireless network 205. An interface at the base station 220a (e.g., an air interface) may inspect the traffic 213 and transmit the traffic 221a that contains RBR information 221b to the RNC 235a. Alternatively, the base station 220a may transmit traffic 221a that contains RBR information 221b to the WES 230a, which may then transmit a relevant subset of the traffic 221a and RBR information 221b to the traffic controller 260. While various configurations may be implemented, the base stations 220a-b may, for example, communicate the traffic 221a and RBR information 221b to the RNC 235a via the WES 230a.

The RNC 235a may convert and inspect the traffic 221a to discover the RAB information 236b. The RNC 235a may then transmit the RBR information 221b and traffic 236a that contains RAB information 236b to the edge router 240. The edge router 240 may transmit the RBR information 221b and RAB information 236b to the traffic controller 260 or the edge router 240 may transmit the RBR information 221b and RAB information 236b to the SGSN 245. Similarly, as mentioned above, while various configurations may be implemented, the RNCs 235a-b may, for example, communicate the RBR information 221b and RAB information 236b to the SGSN 245 via the edge router 240.

The SGSN 245 may then transmit the RBR information 221b and RAB information 236b to the router 250, which may direct the RBR information 221b and RAB information 236b to the GGSN 255. The GGSN 255 may then transmit the RBR information 221b and RAB information 236b to the traffic controller 260. The traffic controller 260 may also receive Internet traffic 270 from the Internet 265. The traffic controller 260 may aggregate the data flows based upon a variety of considerations, such as network information, network wide flow rate factor, and/or mobility aspects of the wireless end user device 210. Then, the traffic controller 260 may steer the shaped data flow by transmitting traffic 280 at the changed communications state through the wireless network 205 via a desired path to an end user. For example, the traffic 280 may be transmitted from the traffic controller 260 through the edge router 240 to the RNC 235a and WES 230a and then through a base station 225a to the end user device 210. The traffic controller 260 may also transmit a rate control signal 283 to the Internet 265.

Telecommunications companies offer backhaul solutions to the mobile network and have aggregation network elements, e.g., Tellabs 8600 series, that connect multiple base stations to a base station controller. Telecommunications companies also offer aggregation network elements, e.g., Tellabs 8800 series, that aggregate multiple base station controllers to a SGSN. These aggregation network elements may be used in moving traffic in the wireless network, e.g., wireless network 205 of FIG. 2.

In an example embodiment, the Tellabs T8700 may be inserted into the network at the Gi interface, between a GGSN and an Internet Service Provider (ISP) peer point, and may collect information from Tellabs T8600, which may be located between a base station and a RNC, and/or Tellabs T8800, which may be located between a RNC and either a SGSN or a traffic controller. The Tellabs T8700 may be the traffic controller 260; the Tellabs T8600 may be the WESs 230a-b; and the Tellabs T8800 may be the edge router 240. The collected information may relate to the radio resource allocations in the form of back station identification, volume of resources allocated per traffic class, usage of resources, time of day these resources were allocated, or combinations thereof. The Tellabs T8700 may use this information to steer the incoming traffic into the wireless network 205 (i.e., GGSN) via an ISP to control the inflow of traffic as per preassigned rules by the network operator. The rules may include granting bandwidth for traffic that is being used by a busy base station based on a particular order. The policies may also be in accordance with operator guidelines. For general operability in networks that do not have devices such as a Tellabs T8600 or T8800, the information to be used for traffic control may be derived from radio network statistics and input to a traffic controller, like the traffic controller 260, in a format that is predetermined. For example, various embodiments of the invention for gathering this type of information are described above in reference to FIGS. 1A-1-1D.

FIGS. 3-5B are flow diagrams depicting communication data flows that may occur within embodiments of the present invention. The flow diagrams may refer to the wireless network 105.

FIG. 3 is a flow diagram 300 that may be used by an interface between a base station and a RNC in accordance with an example embodiment of the present invention. The flow diagram 300 may begin where data is transmitted 305, for example, from the end user device to a base station (e.g., from an end user device 110 to base station 120a of FIG. 1A-2). The base station may transmit 310 the received data traffic content (e.g., data traffic content 113 of FIG. 1A-2) to an Iub interface, which is the interface between the base station and the RNC (e.g., RNC 135a of FIG. 1A-2). The Iub interface then transmits the Iub data flow (e.g., Iub data flow 121a of FIG. 1A-2). The following three actions may be performed on the Iub data flow: reviewed 315 based upon the provisioned settings, filtered 330 using deep packet inspection (DPI), or aggregated/packaged 340.

Continuing to refer to FIG. 3, the Iub data flow may be reviewed 315 by analyzing the header information from Iub data flow for location association, which allows the service provider to offer quality of experience independent of the location of the end user. The proprietary header information of the Iub data flow may be packaged with the radio bearer (RB) allocation information. After the Iub data flow is filtered 330 by DPI, the filtered Iub data flow may be monitored 335 to establish RB allocation per session. The RB allocation per session may then be packaged with the proprietary header information. The packaged Iub data flow or the Iub data flow, either individually or in combination, may be collected (or aggregated) 340. The aggregated data flow may then be transmitted 345 to the RNC (e.g., RNC 135a of FIG. 1A-2).

Figure 4:
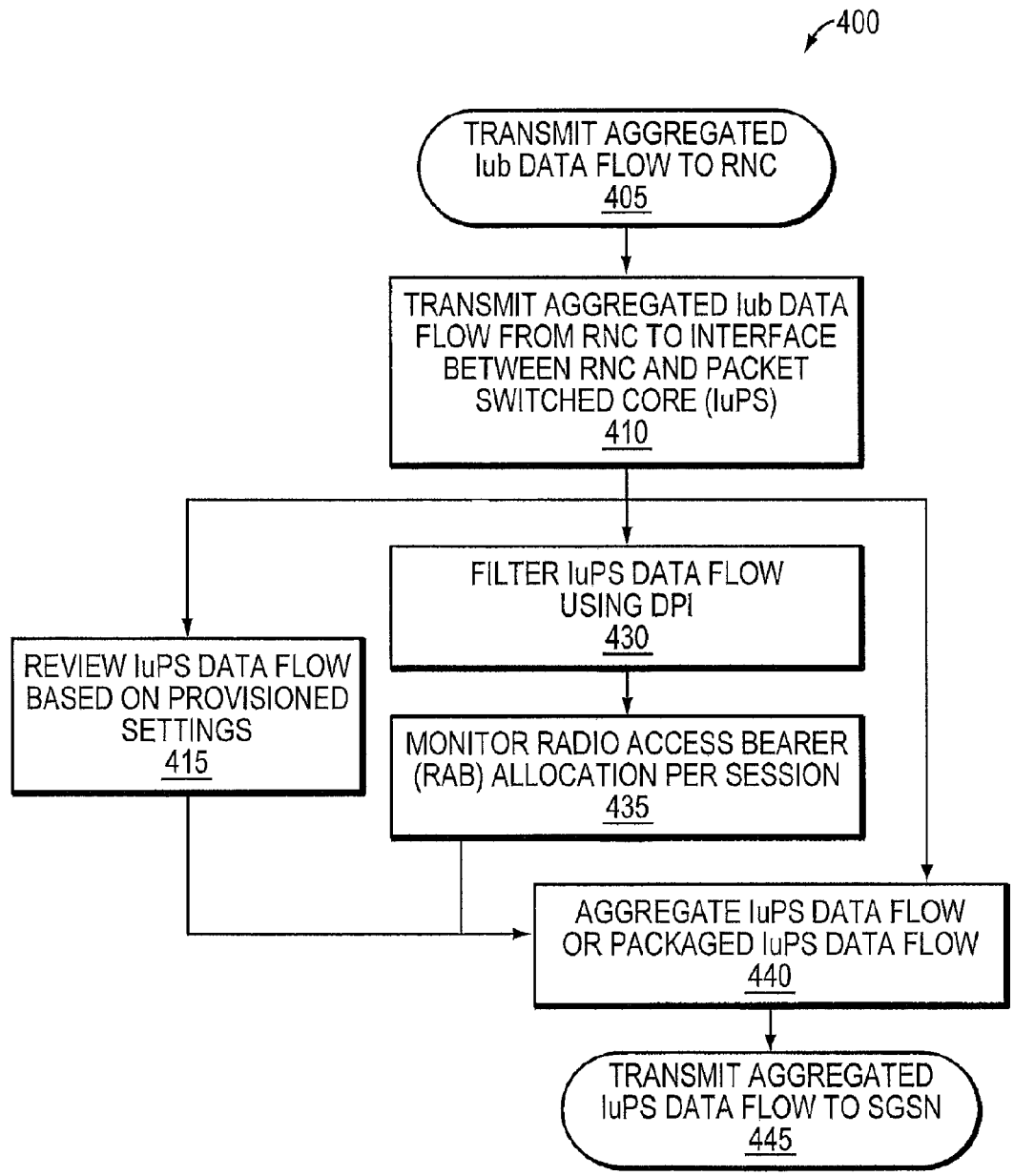

FIG. 4 is a flow diagram 400 that may be used by an interface between a RNC and a packet switched core (also referred to as IuPS interface) in accordance with an example embodiment of the present invention. The method 400 may begin where aggregated Iub data flow is transmitted 405, for example, from the RNC to SGSN (e.g., from RNC 135a to SGSN 145 of FIG. 1A-2). The RNC aggregates multiple Iub data flows and concerts 410 the data packets into an IuPS data flow (e.g., IuPS data flow 136a of FIG. 1A-2), which may be reviewed 415 based upon provisioned settings, filtered 430 using DPI, or aggregated 440.

The header information from the IuPS data flow may be analyzed for location association after the IuPS data flow has been reviewed 415 based upon the provisioned settings. The proprietary header information of the IuPS data flow may be packaged with the radio access bearer (RAB) allocation per session information. After the IuPS data flow is filtered by a DPI 430, the filtered IuPS data flow may be monitored 435 to establish RAB allocation per session. The RAB allocation may then be packaged with the appropriate header information. The packaged IuPS data flow or the IuPS data flow, either individually or in combination, may be then aggregated 440. The aggregated data flow 443 may then be transmitted 445 to the GGSN (e.g., GGSN 155 of FIG. 1A-2).

Figure 5A:
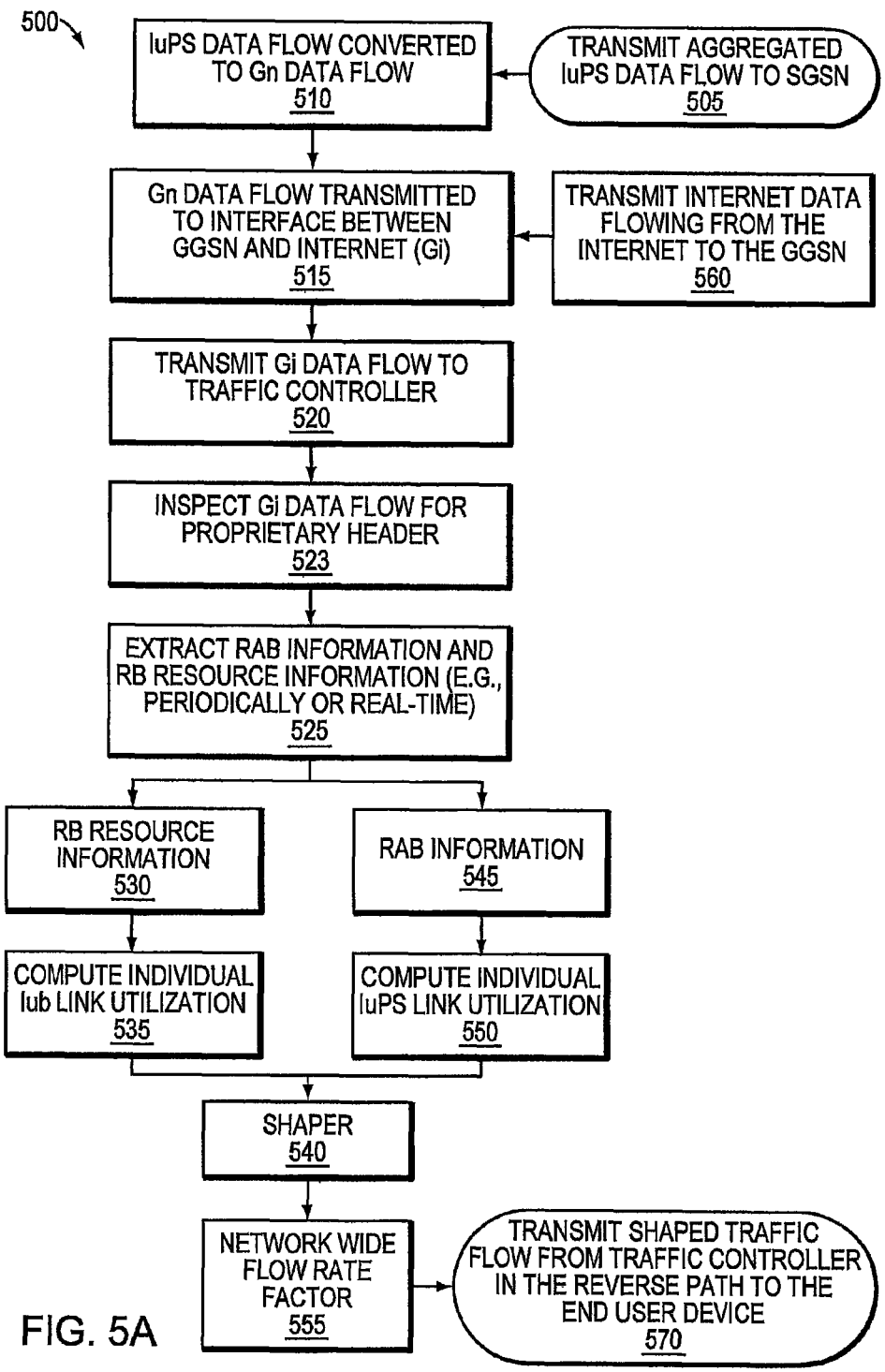

FIG. 5A is a flow diagram 500 that may be used by an interface between the GGSN and the Internet (also referred to as "Gi interface") in accordance with an example embodiment of the present invention. The method 500 may begin with aggregated IuPS data flow being transmitted 505, for example, from the SGSN to GGSN (e.g., from SGSN 145 to GGSN 155 of FIG. 1A-2), which converts 510 the IuPS data flow into a Gn data flow. The Internet data flow may also be transmitted 560 to the GGSN. The Gn data flow may also be transmitted to the Gi interface, and the Gi data flow may be transmitted 520 to the traffic controller (e.g., traffic controller 160 of FIG. 1A-2). At the traffic controller, the Gi data flow may then be inspected 523 for proprietary header information, and the RAB allocation information and the RB allocation information may be extracted 525 from the proprietary header information. Next, the RB information 530 may be used to compute 535 individual Iub link utilization, and the RB information 545 may be used to compute 550 individual IuPS link utilization. A shaper 540 may be applied to the Iub link utilization information and the IuPS link utilization information to establish a network wide flow rate factor 555. The traffic controller may then transmit 570 shaped traffic flow (e.g., traffic 180 transmitted at the changed communications state of FIG. 1A-2) into the wireless network through the GGSN. The shaped traffic flow may then be transmitted in the reverse path to the end user device.

Figure 5B:
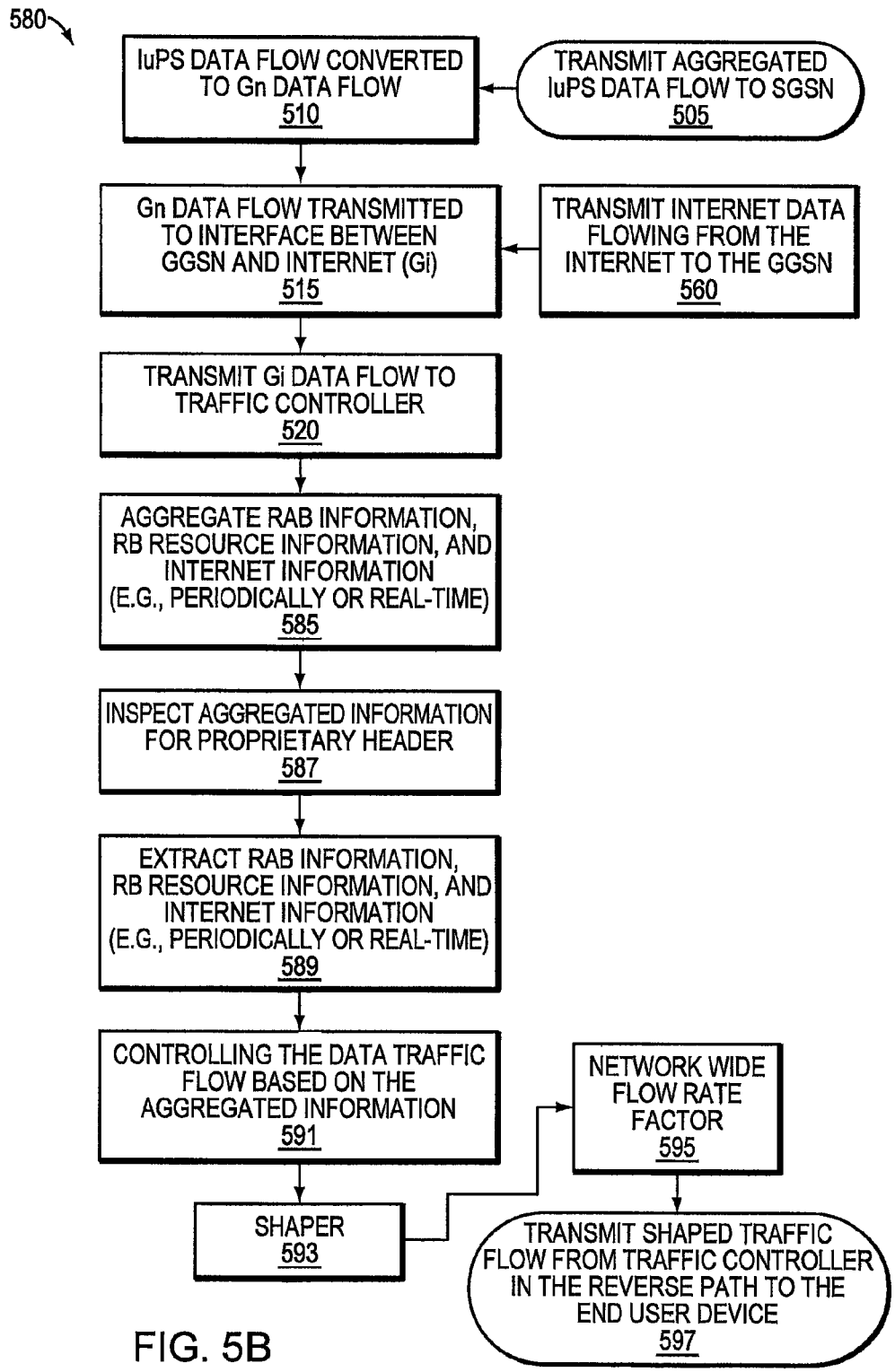

FIG. 5B is an alternative flow diagram 580 to the flow diagram 500 after a traffic controller has received the Gi data flow in accordance with an example embodiment of the present invention. After the Gi data flow has been transmitted 520 to the traffic controller, the traffic controller may then aggregate 585 the radio bearer resource information, radio access bearer information, and, if present, data flow from the Internet 560. Next, the traffic controller may inspect 587 the aggregated information for proprietary header information, which allows for the RAB allocation information, the RB allocation information, and Internet information to be extracted 589. Next, the aggregated information may be used to control 591 the data traffic flow. A shaper 593 may be applied to the aggregated information to establish a network wide flow rate factor 595. The traffic controller may then transmit 597 shaped traffic flow into the wireless network through the GGSN, and the shaped traffic flow is transmitted in the reverse path to the end user device. The traffic controller may receive user-based parameters via the data flow, e.g., via Gi data flow, which allows a network operator to modify the data traffic flow according to the user-based parameters.

Figure 6A:
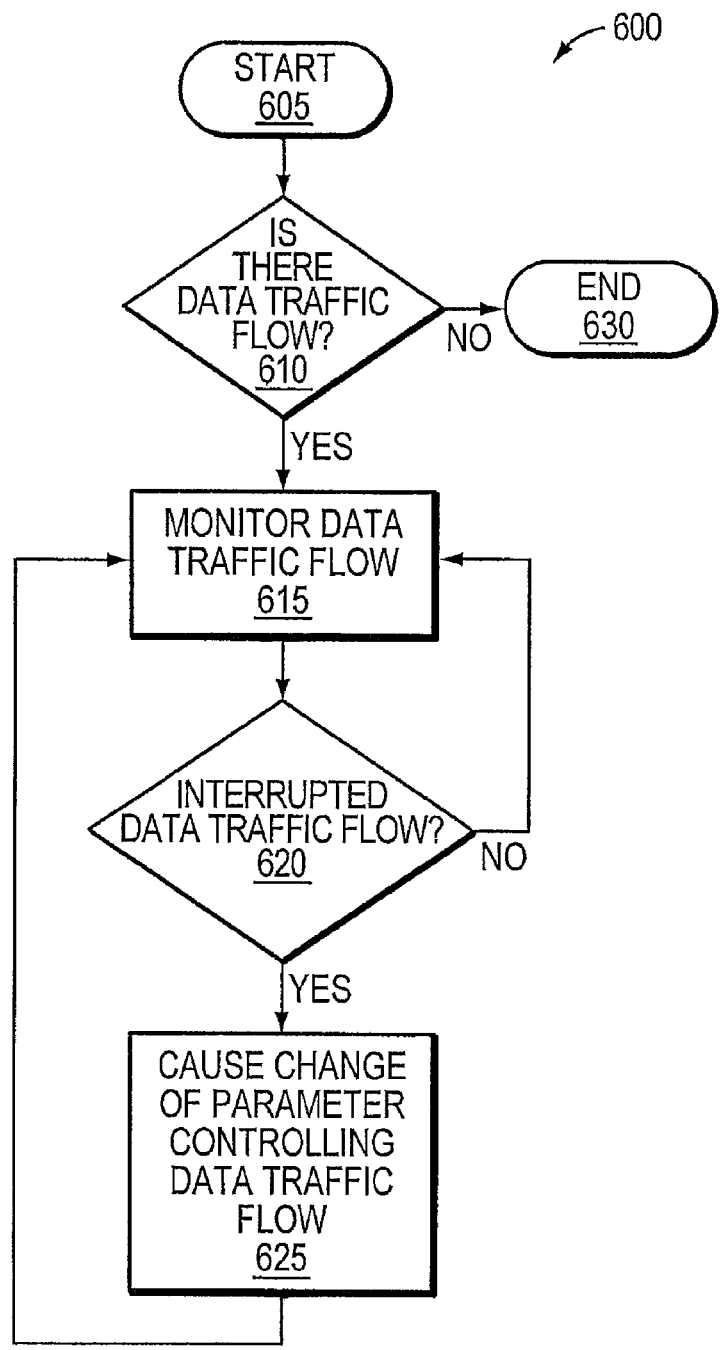
FIGS. 6A-6B are flow diagrams describing monitoring and controlling data traffic flow in accordance with an example embodiment of the present invention.
Figure 6B:
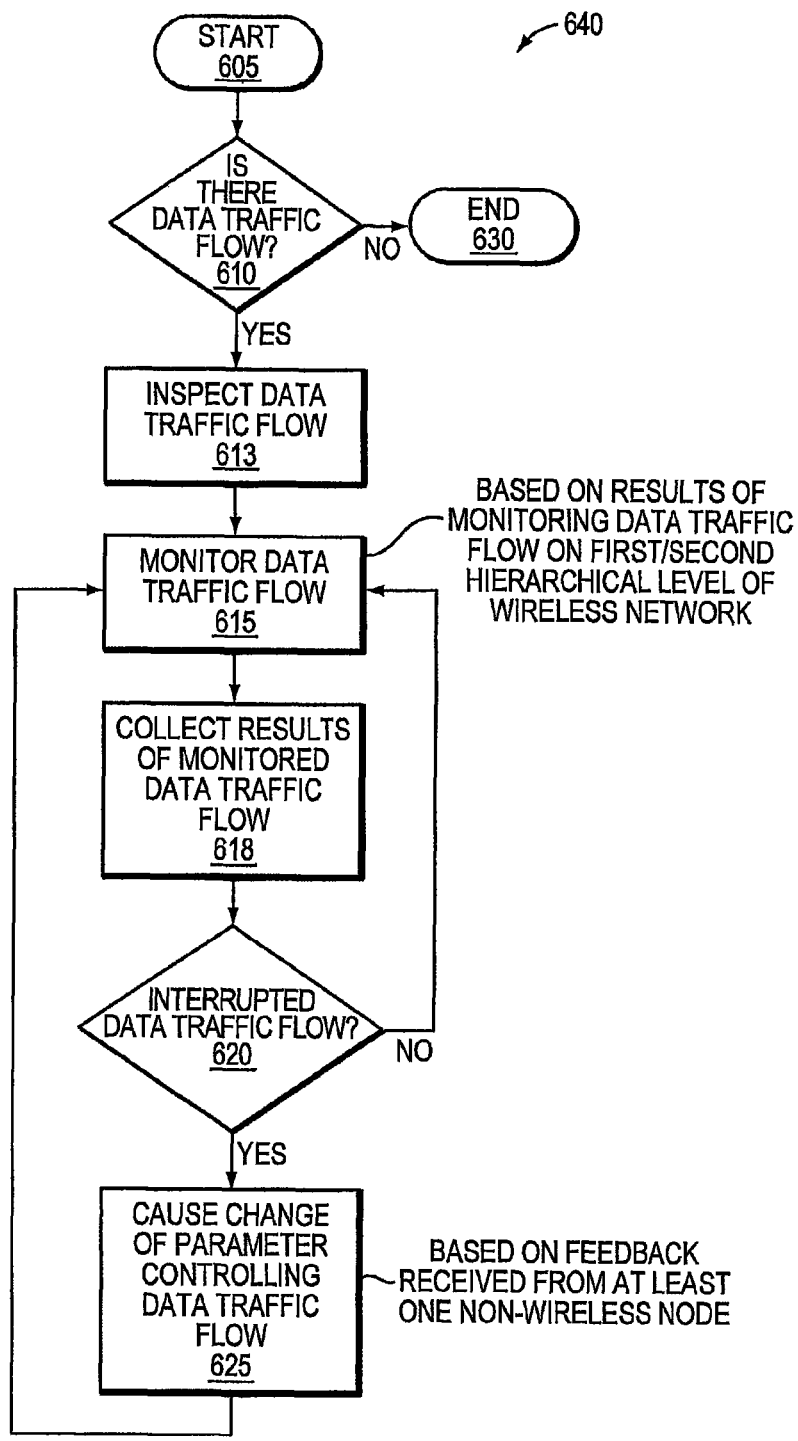

FIGS. 6A-6B are flow diagrams describing monitoring and controlling data traffic flow in accordance with an example embodiment of the present invention.

As illustrated by FIG. 6A, monitoring and controlling data traffic flow 600 in accordance with an example embodiment of the present invention may begin 605 if data traffic is flowing 610 to or from an end user device in communication with the wireless network (e.g., wireless network 105 of FIG. 1A-2). If data traffic is flowing 610, the traffic is monitored 615, either (i) along at least one logical link carrying data traffic flow or (ii) data traffic flow between non-wireless nodes of the wireless network. If the data flow is interrupted 620, a change of at least one parameter controlling data traffic flow will be made 625. The change may be done as a function of the monitoring to support mobility of the end user device(s) relative to the non-wireless nodes of the wireless network. The monitoring 615 of the data traffic may continue as long as data traffic flows 610 through the wireless network. Once it is detected that the data traffic flow 610 has ceased, the data traffic is no longer monitored 630.

FIG. 6B illustrates additional considerations that may be used to monitor and control data traffic flow 640 in accordance with an example embodiment of the present invention. Monitoring and controlling data traffic flow 640 begins 605 if data traffic is flowing 610 to or from an end user device in communication with the wireless network (e.g., wireless network 105 of FIG. 1A-2). If data traffic is flowing 610, the data traffic flow may be inspected 613 at a non-wireless node configured to determine radio bearer resource (RBR) information and at a non-wireless node configured to determine radio access bearer (RAB) information. Next, the traffic is monitored 615, either (i) along at least one logical link carrying data traffic flow or (ii) data traffic flow between non-wireless nodes of the wireless network. The data traffic flow may be monitored 615 in a first hierarchical level of the wireless network and/or a second hierarchical level of the wireless network. Next, the results of the monitoring may be collected 618. If the data flow is interrupted 620, a change of at least one parameter controlling data traffic flow will be made 625. The change may be made 625 based on feedback received from at least one of the non-wireless nodes, and involve changing at least one parameter used in connection with wireless communications of the end user devices. The monitoring 615 of the data traffic may continue as long as data traffic flows 610 through the wireless network. Once it is detected that the data traffic flow 610 has ceased, the data traffic is no longer monitored 630.

Figure 7A:
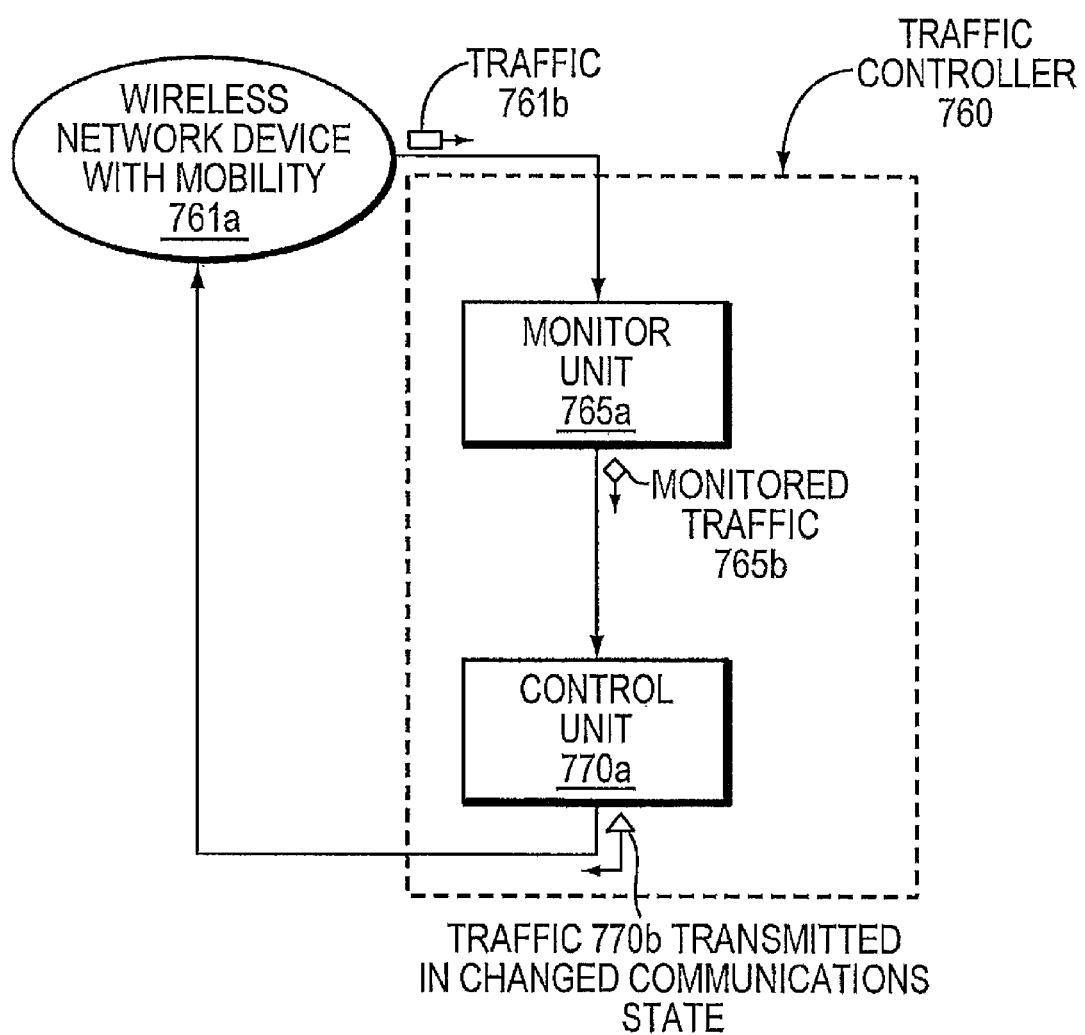
FIGS. 7A-7B are block diagrams illustrating an example embodiment of a traffic controller.

FIG. 7A is a block diagram illustrating an example embodiment of a traffic controller 760 that may be employed in accordance with an example embodiment of the present invention. The traffic controller 760 may be in communication with a wireless network device with mobility 761a which transmits traffic 761b to and receives traffic 770b from the traffic controller 760. The traffic controller 760 may include a monitor unit 765a and control unit 770a. The monitor unit 765a may be configured to monitor (i) at least one logical link carrying data traffic flow or (ii) data traffic flow between non-wireless nodes of the wireless network. The monitor unit 765a may transmit the monitored traffic 765b to the control unit 770a, which is configured to cause a change of at least one parameter controlling data traffic flow. The change of the parameter may be done based on the monitoring of the logical link or data traffic flow to support mobility of the wireless network device with mobility 761 relative to the non-wireless nodes of the wireless network (e.g., end user device 110 relative to the non-wireless nodes of wireless network 105 of FIG. 1B-2). The control unit 770a may be configured to then transmit the traffic 770b at the changed communications state back to the wireless device with mobility 761a.

Figure 7B:
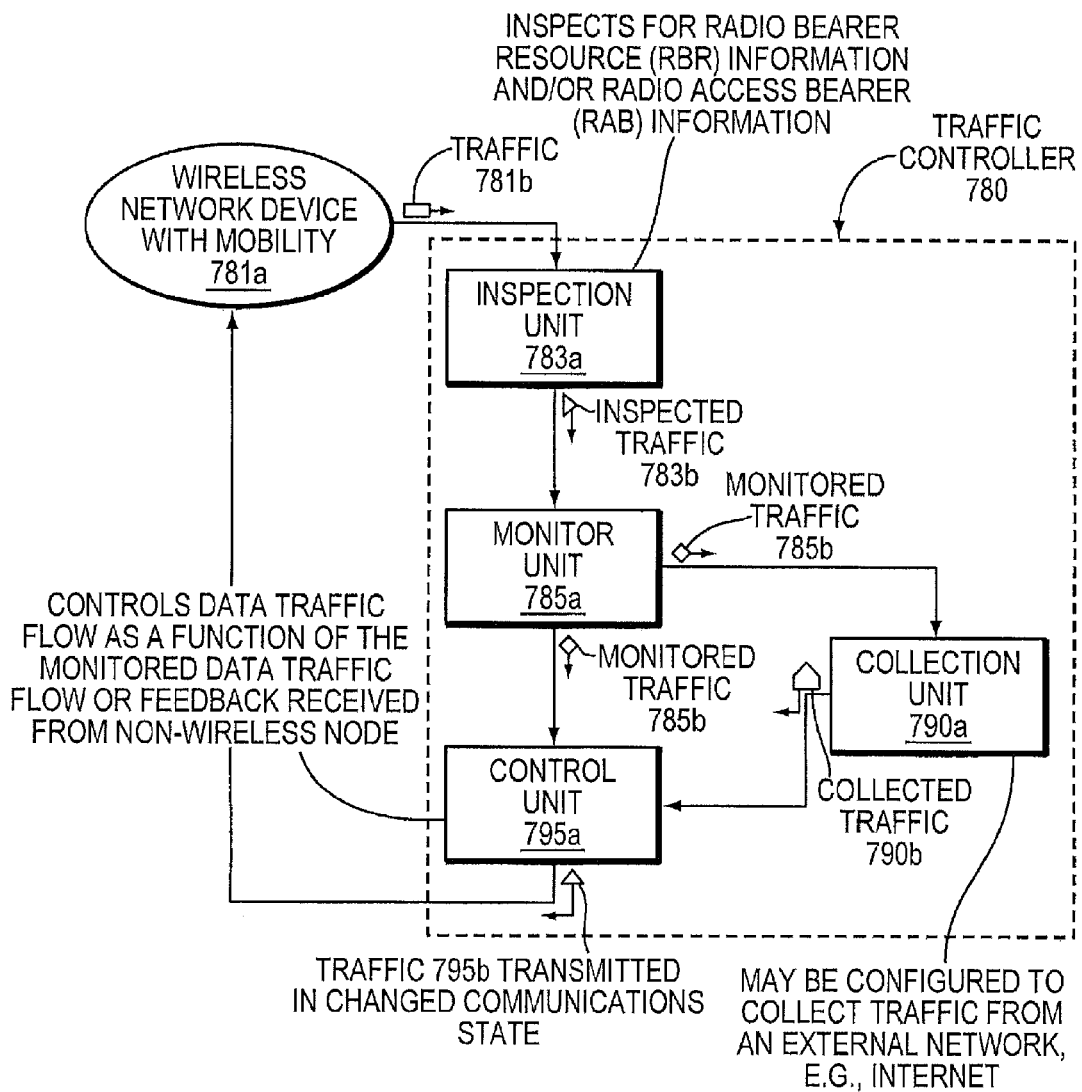

FIG. 7B is a block diagram illustrating an example embodiment of a traffic controller 780 that may be employed in accordance with an example embodiment of the present invention. The traffic controller 780 may be in communication with a wireless device with mobility 781a, which transmits traffic 781b to the traffic controller 780 via a wireless network (e.g., end user device 110 via wireless network 105 of FIG. 1B-2). The traffic controller 780 may include an inspection unit 786a, monitor unit 785a, collection unit 790a, and control unit 795a. The inspection unit 783a may be configured to receive the traffic 781b and inspect the traffic 781b to determine radio bearer resource (RBR) information and radio access bearer (RAB) information. The monitor unit 785a may be configured to monitor the inspected traffic 783b in a first hierarchical level of the wireless network and a second hierarchical level of the wireless network. The monitor unit 785a may then transmit the monitored traffic 785b to either the collection unit 790a or the control unit 795a. The collection unit 790a may be configured to collect results of the monitoring, and transmit the collected traffic 790b to the control unit 795a. The collection unit 790a may also be configured to collect traffic from an external network, such as, for example, the Internet. The control unit 795a may also be configured to cause a change of at least one parameter based on the monitored traffic 785b, which may include feedback received from at least one of the non-wireless nodes. The control unit 795a may then transmit traffic 795b in a changed communications state back to the wireless network device with mobility 781a.

It should be further understood that any of the above-described flow diagrams of FIGS. 3-5B and 6A-6B related to FIGS. 1A-1-1B-2 and FIG. 2 may be implemented in the form of hardware or software, where the term "software" also includes "firmware." If implemented in software, the software may be in any suitable form of software that can be stored on any form of machine-readable medium (e.g., CD-ROM, floppy disk, tape, random access memory (RAM), read-only memory (ROM), optical disk, magnetic disk, FLASH memory, system memory, and hard drive), and loaded and executed by at least one general purpose or application specific processor. The software may be transported and applied to a Wireless Edge Server or System (WES), edge router, or other device employing the example methods or apparatuses described herein or downloaded to nodes in a network via any form of network link, including wired, wireless, or optical links, and via any form of communications protocol.

It should be further understood that the flow diagrams of FIGS. 3-5B and 6A-6B are merely examples. Other configurations, arrangements, additional blocks, fewer blocks, and so forth are possible in other embodiments.

While this invention has been particularly shown and described with references to example embodiments thereof, it will be understood by those skilled in the art that various changes in form and details may be made therein without departing from the scope of the invention encompassed by the appended claims. For example, the RAN usage based traffic management mechanism is discussed herein using a 3GPP GSM based network; this technology can be applied to 3GPP2 based network also. In addition, an embodiment of the present invention may include alternative wireless broadband networks, e.g., WiMAX and LTE, at the GGSN to shape the traffic that goes to the radio access network. The interfaces shown and described may carry traffic (e.g., voice or data) and control information, such as protocols and rules. Embodiments of the present invention may add value in optimizing the network performance by increasing the network usage as part of traffic managing.

What is claimed is:

1. A method of managing data traffic flow in a wireless network, the method comprising:
    inspecting, by a wireless access portion inspection unit, data traffic content in a backhaul portion of the wireless network to determine radio bearer resource information associated with a wireless access portion of the wireless network;
    inspecting, by a backhaul portion inspection unit, the data traffic content in the backhaul portion of the wireless network to determine radio access bearer information associated with the backhaul portion of the wireless network; and
    controlling, by a control unit located in a network interface region between the backhaul portion of the wireless network and a core of the wireless network, data traffic flow in the wireless network as a function of the radio bearer resource information and the radio access bearer information.

2. The method as claimed in claim 1, wherein controlling the data traffic flow is done in upstream and downstream directions.

3. The method as claimed in claim 1, further comprising controlling data traffic flow as a function of radio resource utilization and backhaul resource utilization in the wireless network.

4. The method as claimed in claim 1, further comprising controlling data traffic flow on a periodic basis consistent with mobility aspects of an end user device in a wireless network.

5. The method as claimed in claim 4, wherein controlling the data traffic flow is performed across the wireless network based on information gleaned from the radio bearer resource information and the radio access bearer information.

6. The method as claimed in claim 5, wherein the information gleaned from the radio bearer resource information and the radio access bearer information is applied to traffic that enters the wireless network by performing a deep packet inspection of the traffic that enters the wireless network.

7. The method of claim 1, wherein controlling the data traffic flow is performed in a manner overlaid on the wireless network.

8. The method of claim 1, wherein controlling the data traffic flow includes load balancing.

9. The method of claim 1, wherein inspecting the data traffic content in the backhaul portion of the wireless network to determine radio bearer resource information is performed at a first node in the backhaul portion of the wireless network, inspecting the data traffic content in the backhaul portion of the wireless network to determine radio access bearer information is performed at the first node in the backhaul portion of the wireless network, and the control unit is located at a second node in the network interface region between the backhaul portion of the wireless network and the core of the wireless network.

10. The method of claim 1, wherein inspecting the data traffic content in the backhaul portion of the wireless network to determine radio bearer resource information is performed at a first node in the backhaul portion of the wireless network, inspecting the data traffic content in the backhaul portion of the wireless network to determine radio access bearer information is performed at a second node in the backhaul portion of the wireless network, and the control unit is located at a third node in the network interface region between the backhaul portion of the wireless network and the core of the wireless network.

11. An apparatus for managing data traffic flow in a wireless network, comprising:
    a wireless access portion inspection unit, configured to inspect data traffic content in a backhaul portion of the wireless network, to determine radio bearer resource information associated with a wireless access portion of the wireless network;
    a backhaul portion inspection unit, configured to inspect the data traffic content in the backhaul portion of the wireless network, to determine radio access bearer information associated with a backhaul portion of the wireless network; and
    a control unit, located in a network interface region between the backhaul portion of the wireless network and a core of the wireless network, configured to control data traffic flow in the wireless network as a function of the radio bearer resource information and the radio access bearer information.

12. The apparatus as claimed in claim 11, further including a modification unit configured to enable a network operator to modify the data traffic flow based on user-based parameters.

13. The apparatus as claimed in claim 11, wherein the control unit is further configured to control the data traffic flow in upstream and downstream directions.

14. The apparatus as claimed in claim 11, wherein the control unit is further configured to control data traffic flow as a function of radio resource utilization and backhaul resource utilization in the wireless network.

15. The apparatus as claimed in claim 11, wherein the control unit is further configured to control data traffic flow on a periodic basis consistent with mobility aspects of an end user device in a wireless network.

16. The apparatus as claimed in claim 15, wherein the control unit is further configured to control the data traffic flow across the wireless network based on information gleaned from the radio bearer resource information and the radio access bearer information.

17. The apparatus as claimed in claim 16, wherein wireless access portion inspection unit and backhaul portion inspection unit are configured to perform deep packet inspection and provide information produced thereby to the control unit, and wherein the control unit is configured to apply the information gleaned from the traffic that enters the wireless network.

18. A method of managing data traffic flow in a wireless network, the method comprising:
    aggregating, by a wireless access portion collection unit, in a backhaul portion of the wireless network, radio bearer resource information of the data traffic flow associated with a wireless access portion of the wireless network;
    aggregating, by a backhaul portion collection unit, in the backhaul portion of the wireless network, radio access bearer information of the data traffic flow associated with a backhaul portion of the wireless network; and
    controlling, by a control unit located in a network interface region between the backhaul portion of the wireless network and a core of the wireless network, the data traffic flow in the wireless network based on the radio bearer resource information and the radio access bearer information.

19. The method as claimed in claim 18, further comprising aggregating traffic flow from another network, in communication with the wireless network, with the data traffic flow in the wireless network based on the radio bearer resource information and the radio access bearer information.

20. The method as claimed in claim 18, wherein steering the data traffic flow is done in a downstream direction.

21. An apparatus for managing data traffic flow in a wireless network, the apparatus comprising:
a wireless access portion collection unit, in a backhaul portion of the wireless network, configured to aggregate radio bearer resource information of the data traffic flow associated with a wireless access portion of the wireless network;
a backhaul portion collection unit, in the backhaul portion of the wireless network, configured to aggregate radio access bearer information of the data traffic flow associated with a backhaul portion of the wireless network; and
a control unit, located in a network interface region between the backhaul portion of the wireless network and a core of the wireless network, configured to control the data traffic flow in the wireless network based on the radio bearer resource information and the radio access bearer information.

22. The apparatus as claimed in claim 21, further comprising:
a collection unit configured to aggregate traffic flow from another network, in communication with the wireless network, with the data traffic flow in the wireless network based on the radio bearer resource information and the radio access bearer information; and
the control unit further configured to control the data traffic flow in the wireless network based on the radio bearer resource information, the radio access bearer information, and the traffic flow from another network, in communication with the wireless network.

23. The apparatus as claimed in claim 22, wherein the control unit is further configured to steer the data traffic flow in a downstream direction.

24. The apparatus as claimed in claim 21, wherein the control unit is further configured to modify the data traffic flow based on user-based parameters.

25. A method of controlling data traffic flow in a wireless network, the method comprising:
monitoring, by a monitor unit, in a backhaul portion of the wireless network, at least one logical link carrying data traffic flow or at least one physical link carrying the data traffic flow between non-wireless nodes of the wireless network, the data traffic flow being to or from end user wireless devices;
inspecting, by a first inspection unit, data traffic content of the data traffic flow in the backhaul portion of the wireless network to determine radio bearer resource information associated with a wireless access portion of the wireless network;
inspecting, by a second inspection unit, the data traffic content of the data traffic flow in the backhaul portion of the wireless network to determine radio access bearer information associated with the backhaul portion of the wireless network; and
causing, by a control unit in a network interface region between the backhaul portion of the wireless network and a core of the wireless network, a change of at least one parameter controlling the data traffic flow as a function of the radio bearer resource information and the radio access bearer information in a manner supporting mobility of the end user devices relative to the non-wireless nodes.

26. The method of claim 25, wherein causing a change of at least one parameter of the data traffic flow is performed based on feedback received from at least one of the non-wireless nodes.

27. The method of claim 25, further comprising monitoring the data traffic flow in a first hierarchical level of the wireless network and a second hierarchical level of the wireless network.

28. The method of claim 25, further comprising collecting results of the monitoring, and wherein causing the change takes into consideration multiple results.

29. The method of claim 25, wherein, as a function of the monitoring, controlling data traffic flow in the wireless network, includes a change of at least one parameter used in connection with wireless communications of the end user devices.

30. An apparatus for controlling data traffic flow in a wireless network, the method comprising:
a monitor unit, located in a backhaul portion of the wireless network, configured to monitor at least one logical link carrying data traffic flow or at least one physical link carrying the data traffic flow between non-wireless nodes of the wireless network, the data traffic flow being to or from end user wireless devices;
a first inspection unit, configured to inspect data traffic content of the data traffic flow in the backhaul portion of the wireless network to determine radio bearer resource information associated with a wireless access portion of the wireless network;
a second inspection unit, configured to inspect the data traffic content of the data traffic flow in the backhaul portion of the wireless network to determine radio access bearer information associated with the backhaul portion of the wireless network; and
a control unit, located in a network interface region between the backhaul portion of the wireless network and a core of the wireless network, configured to cause a change of at least one parameter controlling the data traffic flow as a function of the radio bearer resource information and the radio access bearer information in a manner supporting mobility of the end user devices relative to the non-wireless nodes.

31. The apparatus of claim 30, wherein the control unit is further configured to cause a change of at least one parameter of the data traffic flow as a function of feedback received from at least one of the non-wireless nodes.

32. The apparatus of claim 30, wherein the monitor unit is further configured to monitor the data traffic flow in a first hierarchical level of the wireless network and a second hierarchical level of the wireless network.

33. The apparatus of claim 30, further comprising a collection unit configured to collect results of the monitoring.

* * * * *